United States Patent
Shah et al.

(10) Patent No.: US 12,360,937 B2
(45) Date of Patent: Jul. 15, 2025

(54) COMPUTE EXPRESS LINK™ (CXL) OVER ETHERNET (COE)

(71) Applicant: AVAGO TECHNOLOGIES INTERNATIONAL SALES PTE. LIMITED, San Jose, CA (US)

(72) Inventors: Shreyas Shah, San Jose, CA (US); Jeffrey S. Earl, San Jose, CA (US); Anant Thakar, Los Altos, CA (US); Sagar Borikar, Milpitas, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 1 day.

(21) Appl. No.: 18/330,360

(22) Filed: Jun. 6, 2023

(65) Prior Publication Data
US 2023/0385223 A1 Nov. 30, 2023

Related U.S. Application Data

(63) Continuation-in-part of application No. 17/809,484, filed on Jun. 28, 2022.

(60) Provisional application No. 63/223,045, filed on Jul. 18, 2021.

(51) Int. Cl.
*G06F 13/42* (2006.01)

(52) U.S. Cl.
CPC .. *G06F 13/4221* (2013.01); *G06F 2213/0026* (2013.01)

(58) Field of Classification Search
None
See application file for complete search history.

(56) References Cited

U.S. PATENT DOCUMENTS

| | | |
|---|---|---|
| 11,074,208 B1 | 7/2021 | Dastidar et al. |
| 11,388,268 B1 | 7/2022 | Siva et al. |
| 11,573,898 B2 | 2/2023 | Passint et al. |
| 2015/0012679 A1 | 1/2015 | Davis et al. |
| 2015/0169452 A1 | 6/2015 | Persson et al. |
| 2016/0299860 A1 | 10/2016 | Harriman |
| 2016/0381176 A1 | 12/2016 | Cherubini et al. |
| 2019/0042518 A1 | 2/2019 | Marolia et al. |
| 2019/0227936 A1 | 7/2019 | Jang |
| 2020/0192798 A1 | 6/2020 | Natu |

(Continued)

OTHER PUBLICATIONS

"FlexPod Datacenter with Citrix VDI and VMware vSphere 7 for up to 2500 Seats", Cisco, Published Apr. 2022, http://www.cisco.com/go/designzone, 497 pages.

(Continued)

*Primary Examiner* — Charles J Choi
(74) *Attorney, Agent, or Firm* — Foley & Lardner LLP

(57) ABSTRACT

A Compute Express Link™ (CXL) over Ethernet (COE) station is provided to bridge a CXL fabric and an Ethernet network to allow for efficient native memory load/store access to remotely connected resources. The COE station supports CXL and Ethernet traffic through its CXL interface, scheduler/packers, decoders, VOQs and VIQs by adding COE tags to Ethernet frames. In CXL controller mode, the CXL controller drives the VOQs. In Ethernet mode, the COE module drives the VOQs, and interacts with the MAC sublayer and the PMA sublayer, which are responsible for encoding and decoding data signals for transmission through a serializer/deserializer.

20 Claims, 27 Drawing Sheets

(56) References Cited

U.S. PATENT DOCUMENTS

| | | |
|---|---|---|
| 2020/0322287 A1 | 10/2020 | Connor et al. |
| 2020/0341930 A1 | 10/2020 | Cannata et al. |
| 2021/0011755 A1 | 1/2021 | Shah |
| 2021/0075633 A1 | 3/2021 | Sen et al. |
| 2021/0117244 A1 | 4/2021 | Herdrich et al. |
| 2021/0132999 A1 | 5/2021 | Haywood et al. |
| 2021/0240655 A1 | 8/2021 | Das Sharma |
| 2021/0311643 A1 | 10/2021 | Shanbhouge et al. |
| 2021/0311646 A1 | 10/2021 | Malladi et al. |
| 2021/0311739 A1 | 10/2021 | Malladi et al. |
| 2021/0311900 A1 | 10/2021 | Malladi et al. |
| 2021/0318976 A1 | 10/2021 | Zhang et al. |
| 2021/0320866 A1 | 10/2021 | Le et al. |
| 2021/0374056 A1 | 12/2021 | Malladi et al. |
| 2021/0382838 A1 | 12/2021 | Mittal et al. |
| 2022/0124038 A1 | 4/2022 | Leguay et al. |
| 2022/0147476 A1 | 5/2022 | Nam et al. |
| 2022/0164288 A1 | 5/2022 | Ramagiri et al. |
| 2022/0292026 A1* | 9/2022 | Hornung ............. G06F 12/1072 |
| 2022/0326874 A1 | 10/2022 | Del Gatto et al. |
| 2022/0350767 A1 | 11/2022 | McGraw et al. |
| 2022/0383961 A1 | 12/2022 | Lien et al. |
| 2022/0398207 A1 | 12/2022 | Norrie et al. |
| 2022/0405212 A1 | 12/2022 | Kakaiya et al. |
| 2023/0012822 A1 | 1/2023 | Shah et al. |
| 2023/0017583 A1 | 1/2023 | Shah et al. |
| 2023/0017643 A1 | 1/2023 | Shah et al. |
| 2023/0027178 A1 | 1/2023 | Shah et al. |
| 2023/0409302 A1 | 12/2023 | Kodama et al. |

OTHER PUBLICATIONS

Amir Roozbeh, "Realizing Next-Generation Data Centers via Software-Defined "Hardware" Infrastructures and Resource Disaggregation", Doctoral Thesis KTH Royal Institute of Technology, 227 pages.

U.S. Appl. No. 17/809,484, USPTO e-Office Action: CTRS—Requirement for Restriction/Election, Jun. 5, 2023, 5 pages.

Chenjiu Wang, et al., CXL over Ethernet: A Novel FPGA-based Memory Disaggregation Design in Data Centers, Feb. 22, 2023, 9 pgs.

Davide Giri et al, "NoC-Based Support of Heterogeneous Cache—Coherence Models for Accelerators", 2018 Twelfth IEEE/ACM International Symposium on Networks-on-Chip (NOCS), IEEE Oct. 4, 18, pp. 1-8, Section III and figure 3.

Donghyun Gouk, et al., Direct Access, High-Performance Memory Disaggregation with DirectCXL, https://www.usenix.org/conference/atc22/presentation/gouk, Jul. 11-13, 2022, 9 pgs.

Int'l Application Serial No. PCT/US22/73233, ISR/WO mailed Oct. 14, 229 pgs.

Kshitij Bhardwaj et al, "Determining Optimal Coherence Interface for Many-Accelerator SoC's Using Bayesian Optimization", IEEE Computer Architecture Letters, IEEE Sep. 16, 2019, pp. 119-123 Section 3.1; and figure 2.

Kshitij Bhardwaj, et al., "A Comprehensive Methodology to Determine Optimal Coherence Interfaces for Many-Accelerator SoC's", ISLPED '20 Proceedings of the ACM/IEEE International Symposium on Low Power Electronics and Design Aug. 10, 2020, pp. 1-6; Section 5 and figure 2.

Moiz Arif, et al., Exploiting CXL-based Memory for Distributed Deep Learning, 51st International Conference on Parallel Processing (ICPP '22), Aug. 29-Sep. 1, 2022, Bordeaux, France. ACM, New York, NY, USA, 11 pages.

Prateek Shantharama, et al., "Hardware Accelerated Platforms and Infrastructures for Network Functions: A Survey of Enabling Technologies and Research Studies".IEEE Jul. 9, 2020, Digital Object Identifier 10.1109/ACCESS.2017. DOI.

Yakun Sophia Shao, et al. "Co-Designing Accelerators and SoC Interfaces using gem5-Aladdin", 2016 49th Annual IEEE/ACM International Symposium on Microarchitecture (MICRO). IFEE, Oct. 15, 16, pp. 1-12, pp. 3-5 and figure 3.

Zuckerman, et al. "Comeleon: Learning-Based Orchestration ofAccelerator Coherence in Heterogeneous SoCs", Columbia University, New York, New York, arXiv:2109.06382v1 [cs.AR] Sep. 14, 2021, 14 pages.

Non-Final Office Action on U.S. Appl. No. 18/605,301 DTD May 7, 2025.

* cited by examiner

COMPUTE EXPRESS LINK™ (CXL) OVER ETHERNET (COE)

CROSS-REFERENCE TO RELATED APPLICATIONS

This patent document claims the benefit and priority of U.S. Provisional Patent Application No. 63/223,045 to Shah et al., filed on Jul. 18, 2021, and U.S. patent application Ser. No. 17/809,484 to Shah et al., filed on Jun. 28, 2022, the entireties of which are incorporated by reference for all purposes.

BACKGROUND

Compute Express Link™ (CXL) is an interconnect that allows higher bandwidth and lower latency from central processing unit (CPU) to device and CPU to memory connections than previously available interconnects. CXL leverages existing PCI Express (PCIe) physical and electrical interfaces along with PCIe block based input and output protocols. CXL includes communication and pooling capabilities to overcome many performance and packaging limitations of common devices.

However, CXL has a variety of limitations, and it is desirable to further enhance CXL to overcome some of these limitations, especially as processing, memory, and interoperability requirements continue to increase.

OVERVIEW

Compute Express Link™ (CXL) is a high-speed interconnect standard for high-performance computing systems, allowing for low latency, high bandwidth, and direct memory access between CPUs, GPUs, and accelerators. However, it is limited to a particular computing system or rack. Resource utilization in these systems is typically low, and mechanisms like resource virtualization or memory disaggregation can improve efficiency. To address these limitations, a CXL over Ethernet (COE) station is provided to bridge a CXL fabric and an Ethernet network to allow for efficient native memory load/store access to remotely connected resources. The COE station supports CXL and Ethernet traffic through its CXL interface, scheduler/packers, decoders, virtual output queues (VOQs) and virtual input queues (VIQs) by adding COE tags to Ethernet frames. In Ethernet mode, the COE module drives the VOQs, and interacts with the MAC sublayer and the PMA sublayer, which are responsible for encoding and decoding data signals for transmission over the physical media.

In particular embodiments, a Compute Express Link™ (CXL) over Ethernet (COE) station is provided to bridge a CXL fabric and an Ethernet network. The COE station includes a Compute Express Link (CXL) interface connected to a processor, memory, and multiple accelerators over CXL, the CXL interface comprising a plurality of virtual input queues (VIQs) and virtual output queues (VOQs). The COE station further includes an Ethernet interface supporting Ethernet traffic through a serializer/deserializer (SERDES). A CXL controller is configured to handle error correction and manage the flow of data between the processor, memory, and the plurality of devices. A COE module is connected to the CXL interface. The COE module operates to bridge Ethernet traffic with CXL signals. In a first mode, the VIQs and VOQs are driven by the CXL controller and in a second mode, the VIQS and VOQs are driven by the COE module.

Illustrative, non-exclusive examples of inventive features according to the present disclosure are described herein. These and other examples are described further below with reference to figures.

BRIEF DESCRIPTION OF THE DRAWINGS

The disclosure may best be understood by reference to the following description taken in conjunction with the accompanying drawings, which illustrate various embodiments.

DETAILED DESCRIPTION

Figure 1A:
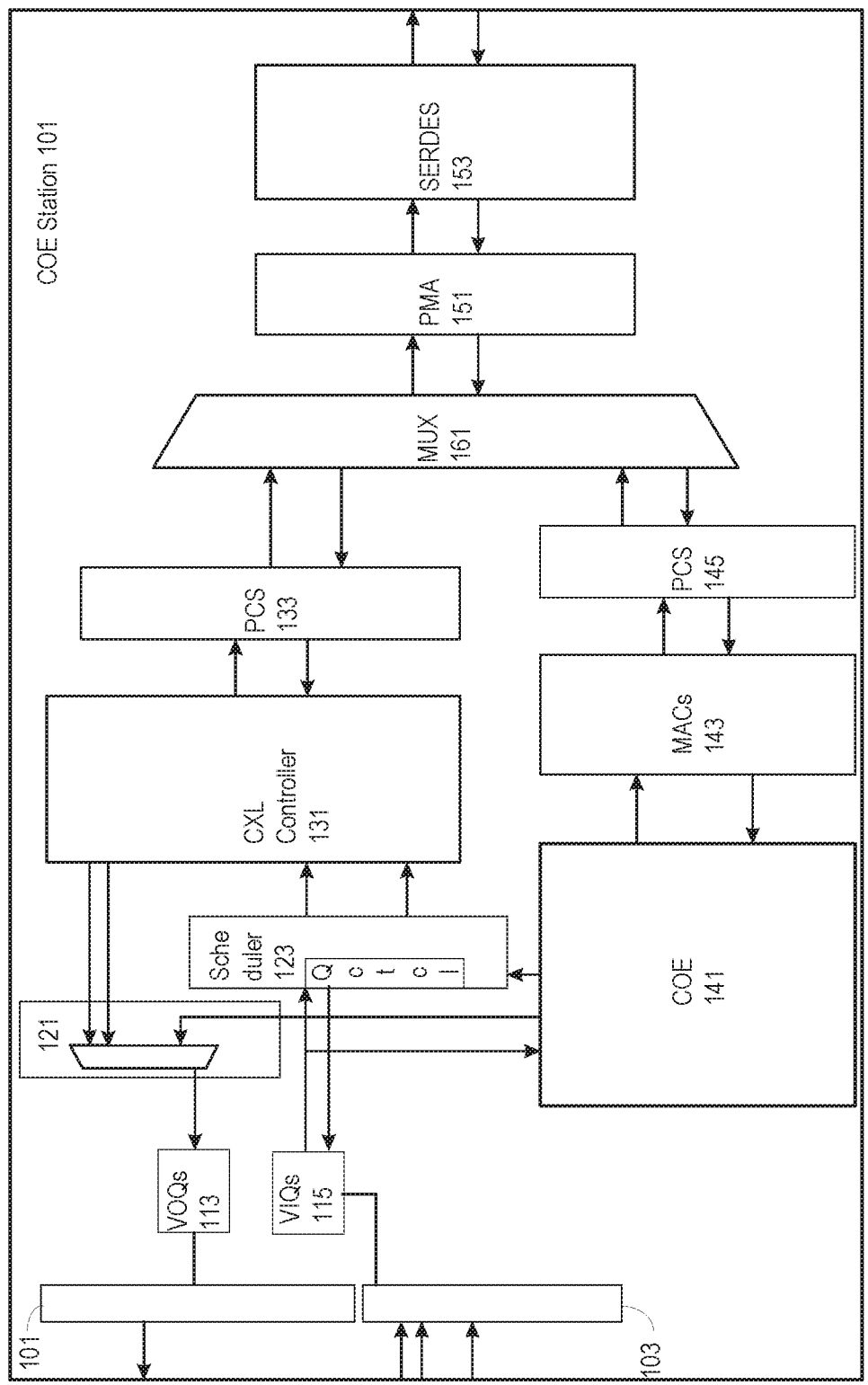
FIGS. 1A-1B illustrates an example of a Compute Express Link (CXL) over Ethernet (COE) station.

In the following description, specific details are set forth to provide illustrative examples of the systems and techniques described herein. The presented concepts may be practiced without some, or all, of these specific details. In other instances, well known process operations have not been described in detail to avoid unnecessarily obscuring the described concepts. While some concepts will be described with the specific examples, it will be understood that these examples are not intended to be limiting.

For the purposes of this disclosure, certain Figures may include a plurality of similar components. The plurality of such components may be indicated with A, B, C, D, E, F, G, H, . . . N, and/or such indicators to distinguish the individual such components within the Figures In certain instances, references may be provided to such components without reference to the letter indicators. It is appreciated that, in such instances, disclosure may apply to all such similar components.

CXL is a high-speed interconnect standard designed for use in high-performance computing systems. It is designed to provide low latency, high bandwidth, and efficient memory sharing between CPUs, GPUs, and other accelerators. One of the key benefits of CXL is that it allows for direct memory access (DMA) between devices, which can significantly reduce the overhead associated with moving data between devices. However, CXL is typically limited within a particular computing system, server, or a particular rack, as CXL is a system level/bus level interconnect.

Resource utilization in particular computing systems, servers, or within a particular rack is typically low. Memory and hardware accelerators can be more efficiently utilized and allocated by using mechanisms like resource virtualization or memory disaggregation. These mechanisms decouple processors and resources. However, in traditional network communication, data is copied from one system's memory to the network interface, then to the other system's network interface, and finally to the other system's memory. This process involves multiple copies of the data and can be slow and inefficient.

Technologies like Remote Data Memory Access (RDMA) can improve efficiency by transferring data directly from one system's memory to the other system's memory, without involving the operating system or processor. This allows faster, more efficient data transfer, with lower latency and less processor overhead. However, RDMA requires specialized network hardware and software support, including network adapters that support RDMA and software libraries that provide RDMA capabilities. Some examples of RDMA technologies include InfiniBand and RoCE (RDMA over Converged Ethernet).

To overcome some of these limitations, the techniques of the present invention contemplate providing a CXL over Ethernet (COE) station. According to various embodiments, the COE station is a system on a chip or other integrated circuit device or component that operates as a bridge between a CXL fabric and an Ethernet network. The COE station allows native memory load/store access to remotely connect resources including disaggregated memory that extends beyond the system level or the rack level. By using a COE station instead of using a mechanism like a network adapter, low latency, high throughput, low CPU utilization, and lower network congestion are possible as data does not need to be packetized by a CPU and operating system.

In particular embodiments, the COE station can operate as a regular CXL component that also supports Ethernet traffic through a serializer/deserializer (SERDES). An integrated circuit device that can operate both as a CXL controller and as a bridge linking a CXL fabric to an Ethernet network is referred to herein as a COE station or a CXL over Ethernet station.

COE improves packet processing at each node in the network by adding a tag at the first entry point and tag switching across an entire network. This saves latency and decreasing complexity of packet processing on a hop by hop basis. COE also scales CXL traffic from within a chassis to traffic inter-chassis, intra-chassis, inter-rack, and intra-rack. Various server resources such as compute, storage, networking, machine learning/artificial intelligence resources and accelerators can be pooled and shared with various compute resources at scale to increase the efficiency of devices. Each server in a server cluster no longer needs to have its own potentially redundant hardware accelerators, memory resources, storage resources, etc., but these resources can be pooled and shared amongst multiple servers and server clusters over COE.

According to various embodiments, COE with its reliability, availability, and scalability, can replace the Remote Direct Memory Access (RDMA) protocol that is widely used in server infrastructure today, as COE has lower latency and higher bandwidth than RDMA. According to various embodiments, the techniques of the present invention contemplate providing a tag in a preamble to send/receive traffic from a variety of applications including CXL, ML/AI, and high performance computing (HPC). These tags can be used to tunnel through Ethernet, making use of this tag in in preambles increases the reach of CXL in data centers.

It is recognized that attempts were made to run PCIExpress (PCIe) over Ethernet by adding an Ethernet framing structure. However, it is recognized that this was unworkable due to the high latency and strict rules of PCIe. Various embodiments of the present invention recognize that CXL over Ethernet is possible with out of order execution in a composable and heterogeneous architecture.

According to various embodiments, CXL over Ethernet is implemented by including a tag in a preamble phase during a single point of packet processing. The packet can be switched through the network using that tag. CXL traffic can then be sent through an Ethernet network using that tag while reducing latency and improving efficiency.

FIG. 1A illustrates one example of a COE station 101. According to various embodiments, COE station 101 includes a CXL interface having a scheduler/packers 101 and 123, decoders 103 and 121, virtual output queues (VOQs) 113 and virtual input queues (VIQs) 115.

According to various embodiments, the CXL interface scheduler and packer 101 and 123 work by analyzing the workloads and resource requirements of CXL devices and then packing them into the available slots in the CXL fabric. This allows for more efficient use of available resources and reduces the likelihood of resource contention, which can lead to decreased system performance. The CXL interface decoders 121 and 103 are configured to receive and interpret CXL protocol messages.

VOQs 113 allow efficient data transfer between a host device and an accelerator or memory by managing the flow of data between devices. VOQs operate as a staging area for incoming data until the switch is ready to move the data. In particular embodiments, CXL VOQs assign each accelerator its own set of output queues, which are managed by the host device. When data is sent from the host to the accelerator, it is placed in the appropriate output queue. This allows the accelerator to operate more efficiently and process data more quickly. VIQs 115 allow efficient communication between the CXL devices by operating as buffering for outgoing data (moving from the switch to an external cxl device) In particular embodiments, this can eliminate the need for the device to constantly check for incoming data, which reduces latency and power consumption.

According to various embodiments, the CXL interface is connected to both a CXL controller 131 and a COE Module 141. In particular embodiments, when the COE station 101 operates in a first mode, the CXL controller drives the decoder 121 and the VOQs 113. When the COE station 101 operates in a second mode such as an Ethernet mode, the COE module 141 drives the decoder 121 and the VOQs 113. It will be recognized that a variety of mechanisms such as one or more multiplexers in decoder 121 can be used to toggle between the first and second modes. In particular embodiments, the CXL controller 131 acts as an intermediary between the processor and other resources and manages the data transfer between them. It performs functions such as managing the CXL link, controlling the flow of data, and handling error detection and correction. The CXL controller 131 is responsible for negotiating the link speed and the number of lanes used for communication between the devices. In particular embodiments, supported lanes include 1×8 or 2×4. In other embodiments, 16, 32, or more lanes may be supported. A 1×8 CXL controller has one port that supports eight lanes, while a 2×4 CXL controller has two ports, each supporting four lanes. In particular embodiments, a 1×8 CXL controller provides a single high-bandwidth connection, while a 2×4 CXL controller provides two connections with slightly less bandwidth each.

In particular embodiments, the choice between a 1×8 and 2×4 CXL controller will depend on the specific requirements of the system and the workload. In general, a 1×8 configuration may be preferable for applications that require a single high-bandwidth connection, while a 2×4 configuration may be more appropriate for applications that require multiple, lower-bandwidth or half bandwidth connections. According to various embodiments, other configurations may be possible.

According to various embodiments, the CXL controller may be connected to Physical Coding Sublayer (PCS) 133. According to various embodiments, PCS is responsible for encoding and decoding data signals for transmission over the physical media and error detection and correction. When COE station 101 operates as a CXL station in CXL mode, the ports can be bound or unbound. When they are bound, the system will enumerate through to the device as with a standard CXL station. The CXL interface supports vPPB (Virtual PCIe to PCIe Bridge). vPPB allows communication between CXL and PCIe devices and operates to connect to cxl devices. vPPB can be used to connect a CXL accelerator to a PCIe storage device, allowing the accelerator to access data stored on the storage device. vPPB can also be used to connect a CXL-enabled processor to a PCIe network adapter, enabling high-speed networking capabilities.

Figure 1B:
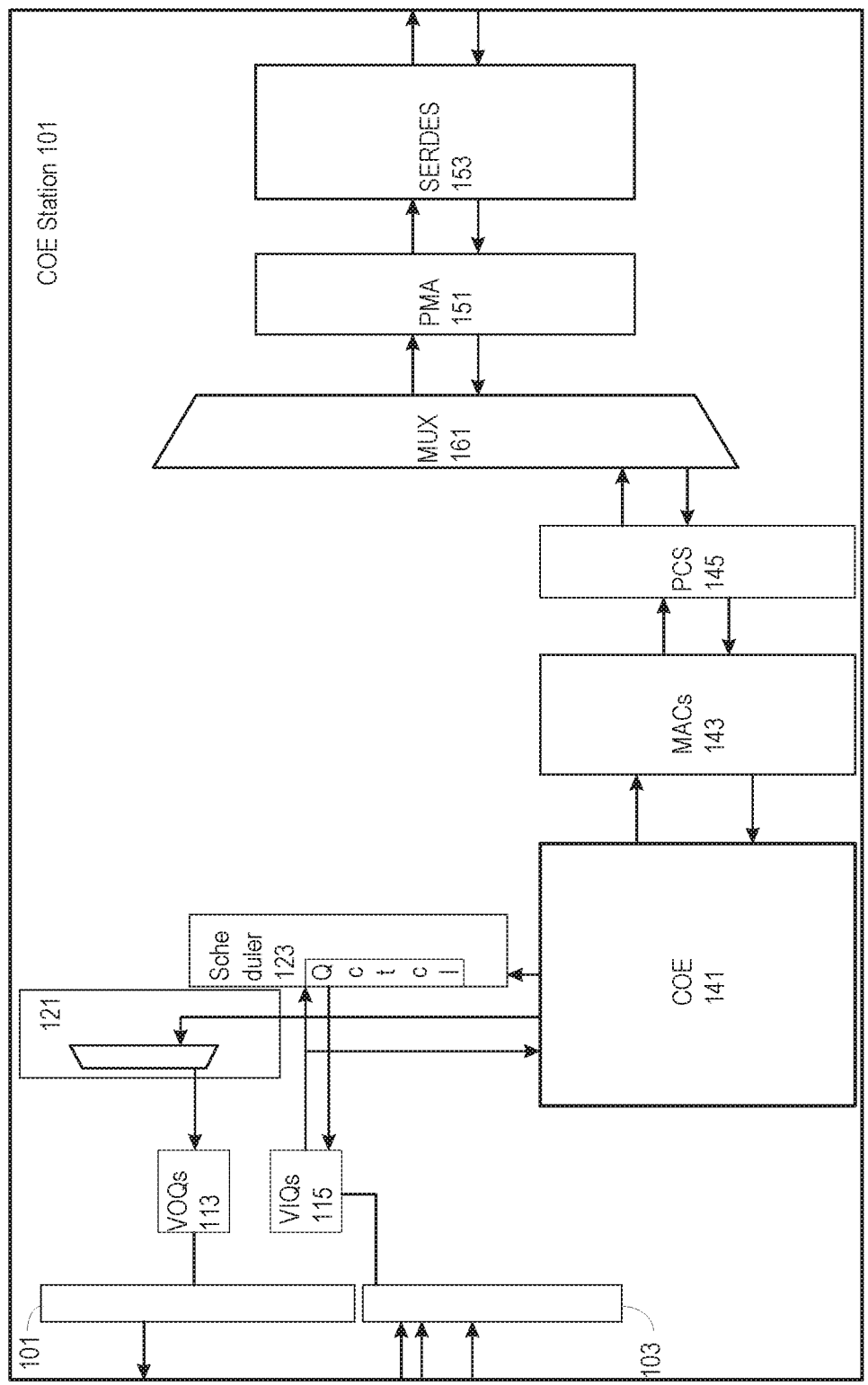

FIG. 1B illustrates an example of the COE station 101 operating in Ethernet mode. According to various embodiments, COE module 141 drives the VOQs 113 and also interacts with Media Access Control (MAC) 143. According to various embodiments, MAC is a sublayer of the Ethernet data link layer that is responsible for the identification and access control of Ethernet network devices and assigns a unique address to each network interface card (NIC) connected to the network, monitoring the network for collisions, and providing access control to the network resources.

The MAC sublayer plays a critical role in the Ethernet network architecture, ensuring that data is transmitted accurately and efficiently between network devices. It is responsible for managing the flow of data between devices, and providing a reliable and efficient mechanism for transmitting and receiving data over the network.

PCS 145 is connected to PMA 151 through multiplexer 161. According to various embodiments, PMA 151 is a sublayer of the Ethernet physical layer that is responsible for the attachment of the physical media to an Ethernet transceiver. It provides the interface between the Ethernet Media Access Control (MAC) layer and the physical media, and is responsible for encoding and decoding data signals for transmission over the physical media.

The PMA sublayer also performs a number of other functions, including signal detection and carrier sense, auto-negotiation of link speed and duplex mode, and fault detection and isolation. In short, it is an essential component of the Ethernet network architecture, ensuring that data is transmitted accurately and efficiently between network devices.

In particular embodiments, PMA 151 is connected to Ethernet Serializer/Deserializer (SERDES) 153. According to various embodiments, SERDES is a device that converts data between serial and parallel interfaces. Specifically, it converts data from the parallel interface of an Ethernet MAC (Media Access Control) to the serial interface of the Ethernet PHY (Physical Layer).

According to various embodiments, in Ethernet mode, a CXL device sees all network-based devices accessed through the COE station 101 as local endpoints during the discovery process. In particular embodiments, each network attached device through the COE station 101 requires a Virtual PCI to PCI Bridge (vPPB). According to various embodiments, a vPPB is a logical entity that bridges between different protocols and communication channels in a CXL fabric.

According to various embodiments, each network attached device through the COE station 101 required an endpoint to be visible to the host. During initialization, vPPB may appear to be unbound (not connected to the endpoint). This allows the real network devices to be initialized and connections made (passing the device information to the VH side control processor and setting up the lookup tables) before allowing the host access to the device through a hot plug event.

The number of vPPB/endpoint pairs presented virtually by the COE station is based on several factors. In an ideal world, the upstream station of the VH could use a single host device manager HDM decoder to map all COE traffic and the COE station could then distribute that memory across different devices on the network (multiple connections from one HDM range). This ideal breaks down if some of those devices on the network go offline (intentionally or unintentionally).

Figure 2A:
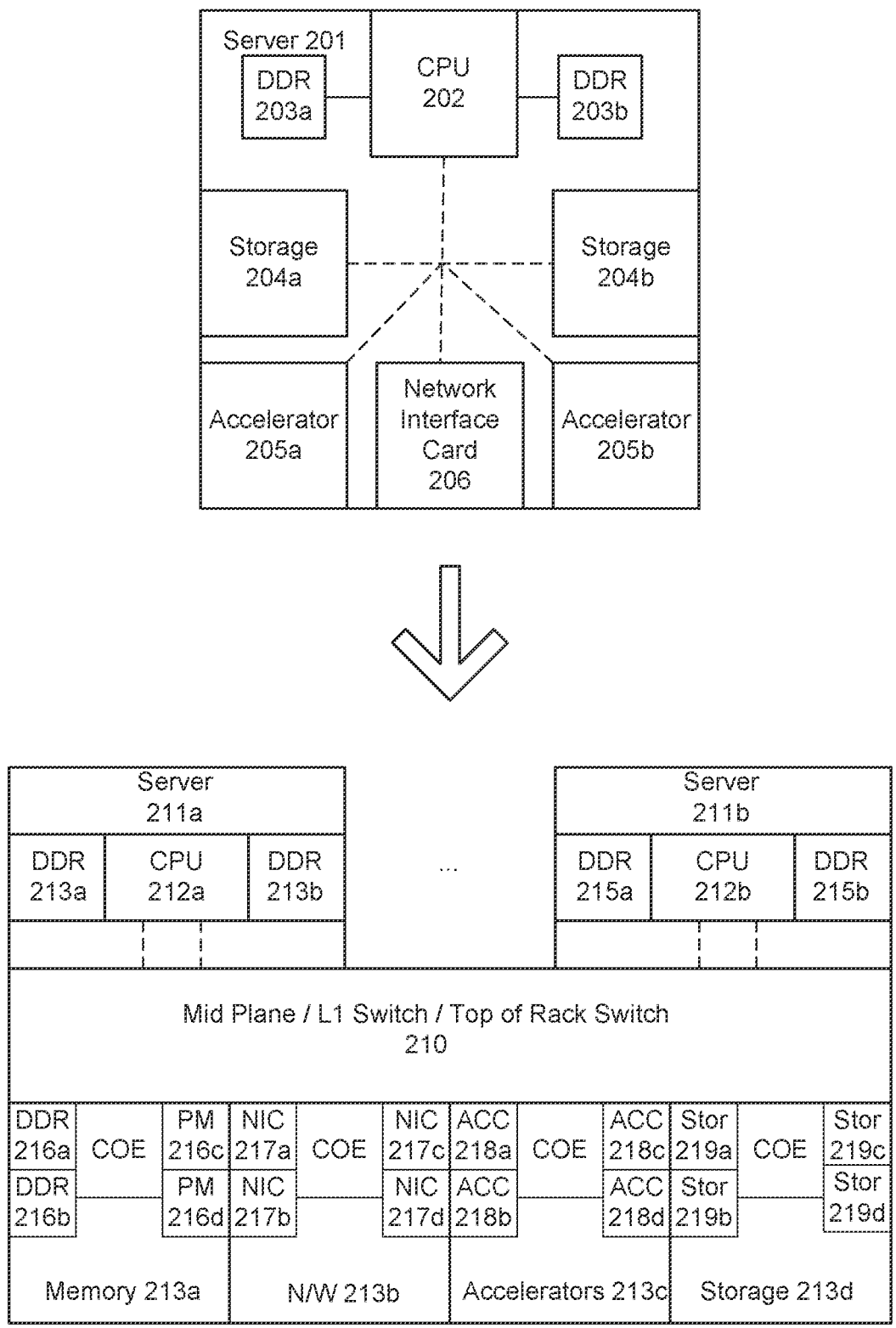
FIG. 2A illustrates server disaggregation with COE.

FIG. 2A illustrates one example of server disaggregation with COE. A server or computing system generally includes one or more processors, memory, as well as other peripheral components and peripheral interfaces, such AI/ML accelerators, NICs, graphics accelerators, storage devices, etc. Applications running on a particular server 201 could access storage 204a and 204b, as well as network interface card 206 and accelerators 205a and 205b. A processor 202 would be connected to these resources as well as DDR 203a and 203b over an interconnect such as PCI-Express and dedicated I/O controllers.

However, servers using conventional internal dedicated I/O controllers are typically over-provisioned with resources such as storage and accelerators for many reasons. One reason is to provide redundancy while another reason is to provide sufficient capacity for the occasional peak loads incurred by the server. Furthermore, there may be a need to provide dedicated bandwidth to different applications. For example, servers are increasingly virtualized to run multiple operating systems in different virtual machines on the same server at the same time. These reasons may lead to multiple I/O controllers installed on virtualized servers. Over-provisioning resources increases the cost and complexity of servers (e.g., servers with many bus slots to accommodate various adapters).

According to various embodiments, a midplane 210 is provided to allow sharing of resources. In particular embodiments, a high-speed interconnect technology such as CXL allows different components such as memory 216a, 216b, 216c, and 216d in memory pool 213a, NICs 217a, 217b, 217c, and 217d in Network Resources pool 213b, accelerators 218a, 218b, 218c, and 218d in accelerator pool 213c, as well as storage 219a, 219b, 219c, and 219d in storage array 213*d* to be shared by servers 211*a* and 211*b*. Server 211*a* may include processor 212*a* and memory 213*a* and 213*b* while server 211*b* may include processor 212*b* and memory 215*a* and 215*b*.

Figure 2B:
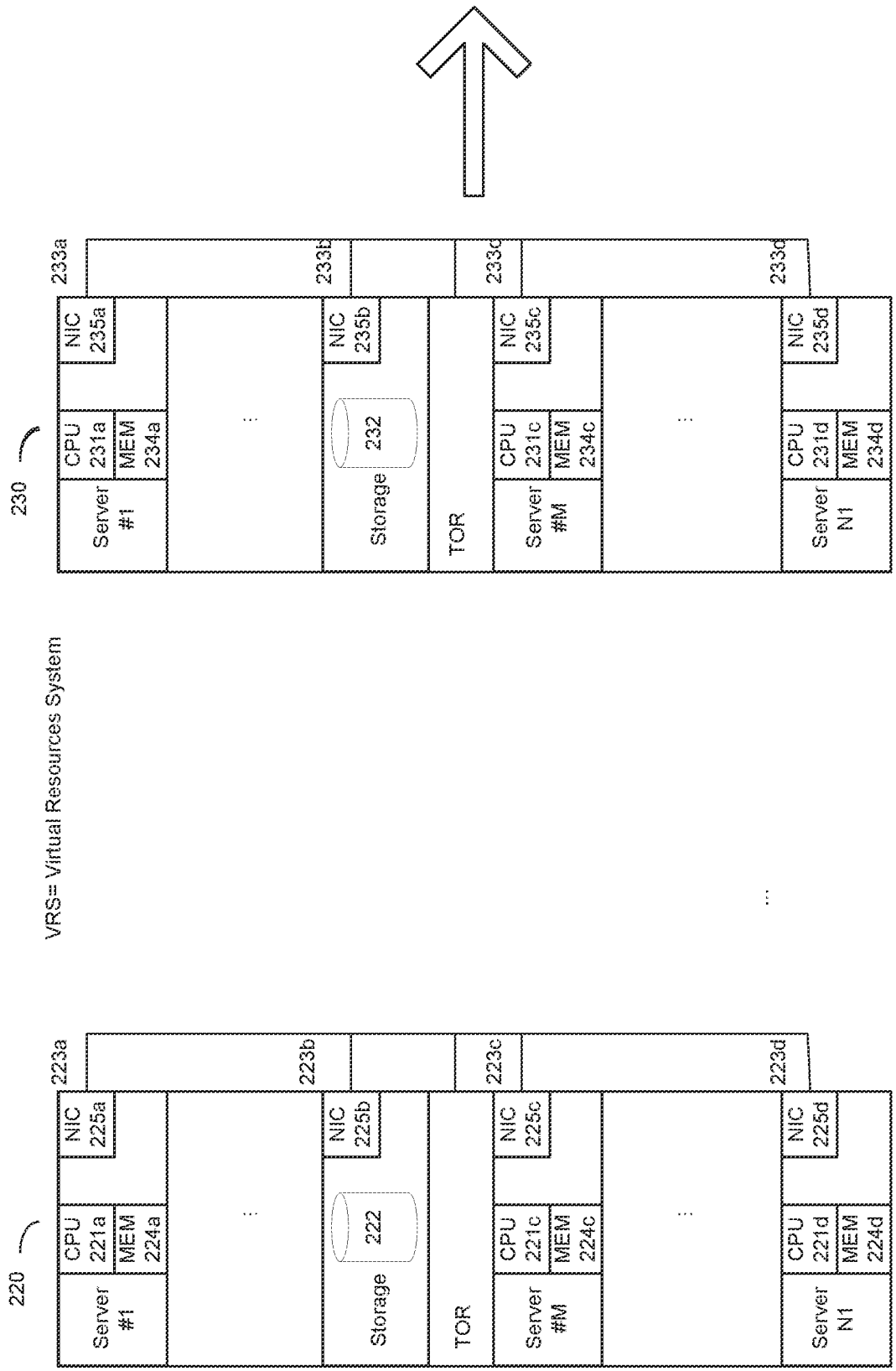
FIG. 2B-2C illustrate virtual resources and rack disaggregation with COE
Figure 2C:
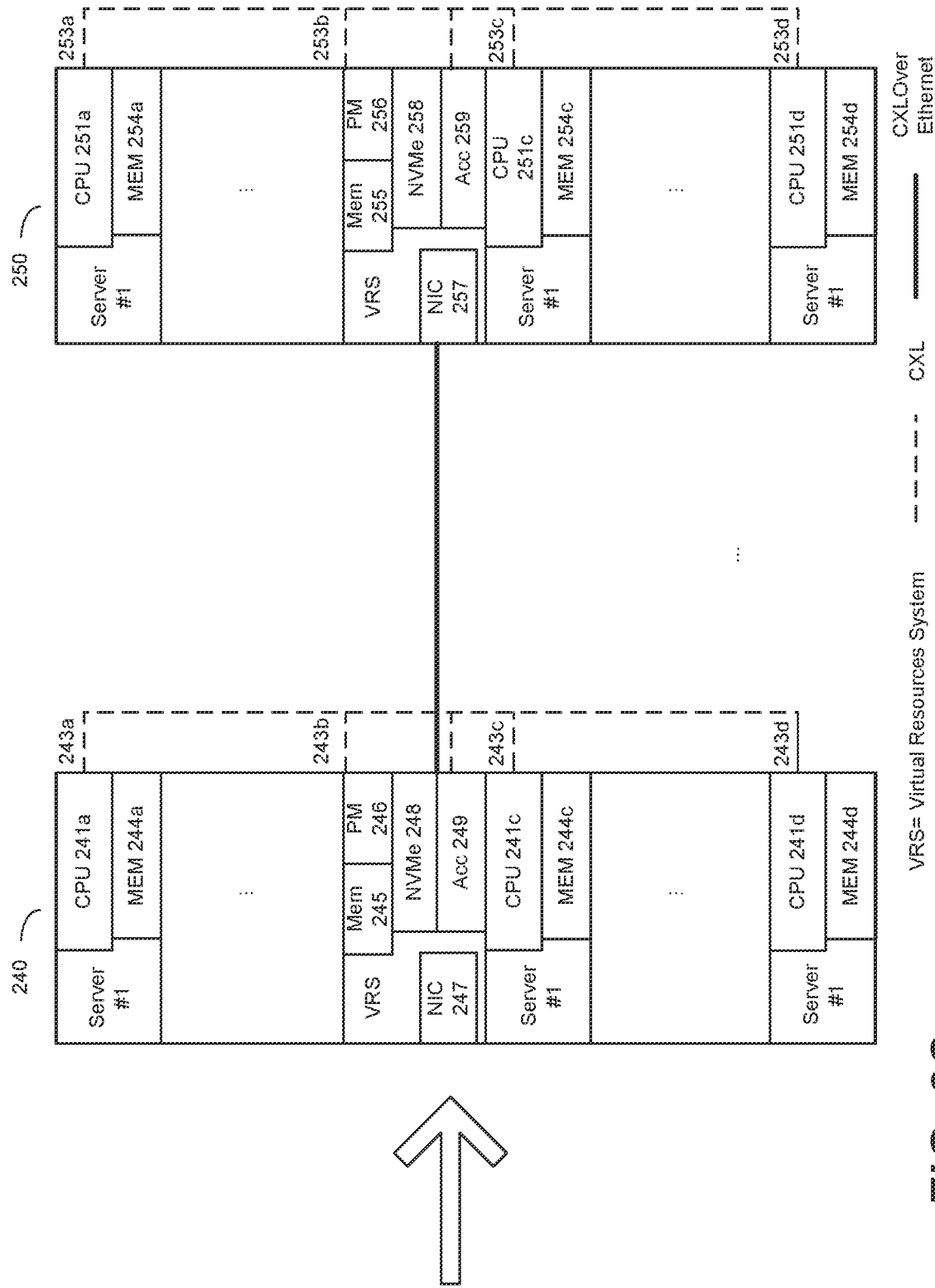

FIG. 2B-2C illustrate another example of systems sharing resources. According to various embodiments, cluster 220 and 230 each include multiple servers and storage resources. Cluster 220 includes servers 223*a*, 223*c*, and 223*d* as well as storage system 223*b*. Server 223*a* includes processor 221*a*, memory 224*a*, and NIC 225*a*. Storage system 223*b* includes storage 222 and NIC 225*b*. Server 223*c* includes processor 221*c*, memory 224*c*, and NIC 225*c*. Server 223*d* includes processor 221*d*, memory 224*d*, and NIC 225*d*. In cluster or rack or network 230, server 233*a* includes processor 231*a*, memory 234*a*, and NIC 235*a*. Server 233*b* includes storage 232 and NIC 235*b*. Server 233*c* includes processor 231*c*, memory 234*c*, and NIC 235*c*. Server 233*d* includes processor 231*d*, memory 234*d*, and NIC 235*d*. According to various embodiments, servers 223*a*, 223*b*, 223*c*, and 223*d* can communicate with each other and potentially share resources over a network such as an Ethernet network and using NICs 225*a*, 225*b*, 225*c*, and 225*d*. In particular embodiments, data could be transferred via Ethernet. However, transferring data and sharing resources using Ethernet requires multiple layers of protocol processing, interrupt processing, and memory copying. Protocol processing, including IP, TCP, and UDP, can add overhead and processing time. Each layer of protocol processing adds additional headers to the packet, which can increase the size of the data being transferred and introduce additional latency. Furthermore, interrupt processing and memory copying are needed. Interrupt processing requires the operating system to interrupt the CPU to handle each packet, which can introduce additional processing overhead and delay. This can be particularly problematic in high-performance computing and data center environments, where processing power is often at a premium. Furthermore, memory copying requires that data first be copied from the application memory to the operating system's memory, and then to the network interface card. This can introduce additional processing and latency, as each copy operation requires data to be read from and written to memory.

Using RDMA can provide performance improvements. RDMA no longer requires processor involvement and reduces protocol overhead. However, CXL is more efficient than RDMA but is conventionally limited to a single chassis. According to various embodiments of the present invention, the reach of the CXL protocol is no longer confined within a single chassis and can be extended to inter rack and intra rack for sharing and pooling of the resources.

According to various embodiments, a chassis 240 includes server 243*a*, 243*c*, 243*d*, and virtual resources 243*b* interconnected using CXL and a chassis 250 includes server 253*a*, 253*c*, 253*d*, and virtual resources 253*b* interconnected using CXL. Server 243*a* includes processor 241*a* and memory 244*a*. Server 243*c* includes processor 241*c* and memory 244*c*. Server 243*d* includes processor 241*d* and memory 244*d*. Virtual resources 243*b* include memory 245, persistent memory 246, NIC 247, accelerators 249, and NVMe 248. Server 253*a* includes processor 251*a* and memory 254*a*. Server 253*c* includes processor 251*c* and memory 254*c*. Server 253*d* includes processor 251*d* and memory 254*d*. Virtual resources 253*b* include memory 255, persistent memory 256, NIC 257, accelerators 259, and NVMe 258. Servers and virtual resources in each chassis are interconnected using CXL.

CXL provides high bandwidth, coherent memory, resource sharing, and low latency. However, CXL is conventionally confined to a single chassis. Ethernet and/or RDMA communications are required for sharing of resources across chassis, and these have a variety of drawbacks and inefficiencies as noted above. Consequently, various embodiments of the present invention contemplate obviating the need for RDMA by providing CXL over Ethernet. According to various embodiments, a tag is sent in a preamble phase of an Ethernet frame.

In particular embodiments, the preamble phase of an Ethernet frame is used to synchronize the timing between the transmitting and receiving devices before the actual data transmission begins. The preamble consists of a series of alternating 1s and 0s, which helps the receiving device to synchronize its clock with the transmitting device's clock. According to various embodiments, the preamble phase of an Ethernet frame is partially usurped to carry data associated with CXL of Ethernet (COE) communications.

This allows severs in chassis 240 and chassis 250 to access each other's resources using COE. An RDMA software stack can be replaced using COE to significantly reduce latency while running HPC, ML/AI workloads on storage, GPU and memory pooling and sharing. COE based switches remove the need for separate CXL switches and Ethernet switches within a chassis, increasing performance by many fold. Furthermore, this seamlessly fits in existing infrastructure of Ethernet in data centers, again reducing the TCO at scale.

Consequently, the techniques and mechanisms described here provide I/O resources such as NICs, HBAs, and other peripheral interfaces in one or more I/O director devices connected to servers over an Ethernet network. Individual servers no longer each require numerous HBAs and NICs, but instead can share HBAs and NICs provided at an I/O director. The individual servers are connected to the I/O director over an Ethernet network, which is used as an I/O fabric. In this configuration, I/O resources can now be shared across the entire server pool rather than being dedicated to individual servers. Quality of service of I/O for individual servers is provided by the I/O director. As a result, fewer I/O resources are required across multiple servers leading to less complex and less expensive systems. Furthermore, such configurations tend to be more flexible and easier to manage since I/O resources can be assigned dynamically without having to change the physical configurations of the servers (e.g., install or remove I/O adapters).

Figure 2D:
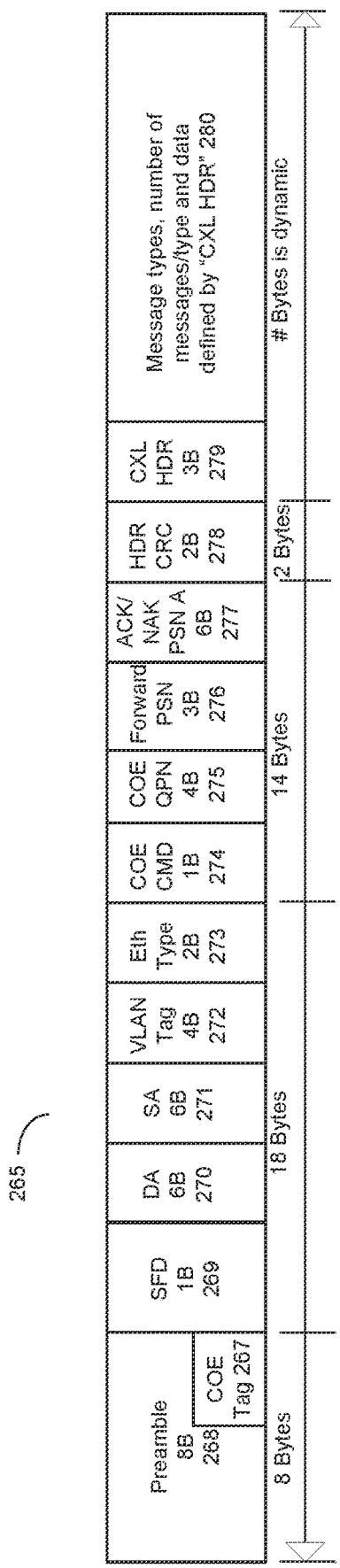
FIG. 2D illustrates a frame format example.

FIG. 2D illustrates one example of a CXL over Ethernet frame format. The Ethernet frame 265 includes a preamble 268. The preamble is the initial segment of bits at the beginning of the Ethernet packet that serves as a synchronization signal between the transmitting and receiving devices. It is typically a sequence of 7 bytes, each with a value of 10101010, followed by an 8th byte with a value of 10101011. However, the techniques of the present invention contemplate using a portion of the preamble to carry a COE tag 267 for COE transmissions. In particular embodiments, the Preamble is followed by a Start of Frame Delimiter (SFD), which is a 1-byte signal indicating the start of the Ethernet packet. Destination Address (DA) 270. According to various embodiments, the DA is a 6-byte field that specifies the MAC address of the destination device. In particular embodiments, source Address (SA) 271 is a 6-byte field that specifies the MAC address of the source device. The VLAN Tag 272 may be a 4-byte field that is used to identify the VLAN to which the frame belongs. According to various embodiments, Ethernet Type 273 is a 2-byte field that specifies the type of payload.

According to various embodiments, COE Command (COE CMD) 274 is a 1-byte field that specifies the type of packet being transmitted, such as a request or response. In particular embodiments, COE Queue Pair Number (COE Queue Pair Number 275 is a 4-byte field that specifies the queue pair number of the packet. The Forward Packet Sequence Number (PSN) 276 is a 3-byte field that contains the packet sequence number of the packet. The Acknowledgment/Not-Acknowledgment Packet Sequence Number (Ack/Nak PSN) 277 is a 6-byte field that contains the sequence number of the packet that is being acknowledged or not acknowledged. According to various embodiments, the Header Cyclic Redundancy Check (HDR CRC) 278 is a 2-byte field that contains the checksum for the packet header.

The CXL Packet Header (HDR) 279 is a 3-byte field that contains information about the CXL packet. The CXL Payload 280 is a variable-length field including information such as message types, number of messages/type of data defined by the CXL HDR 279.

Figure 3:
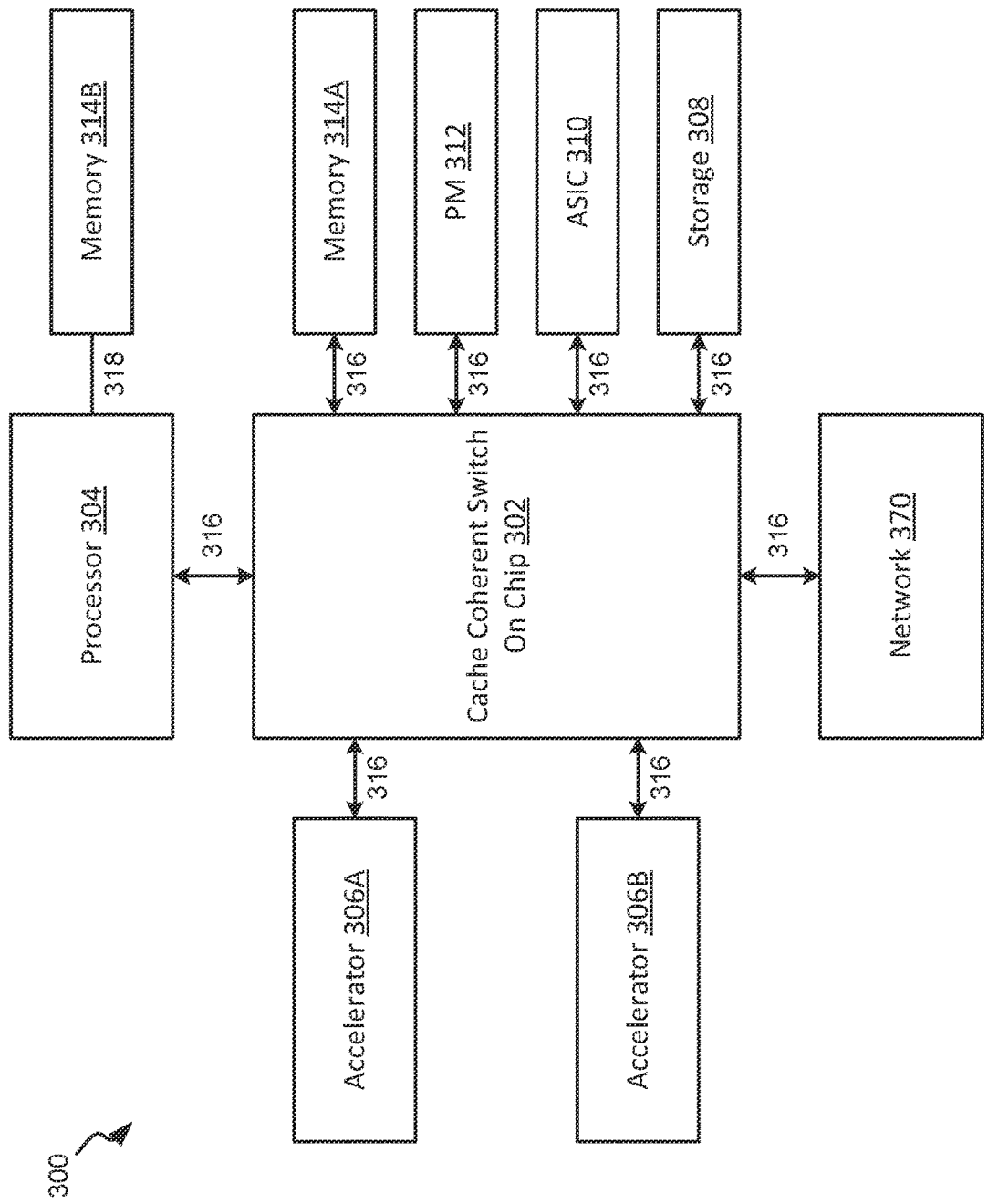
FIG. 3 illustrates a block diagram of an example system, in accordance with some embodiments.

FIG. 3 illustrates system 300 that includes cache coherent switch on chip 302 that can be used with a CXL controller or COE station, processor 304, network 370, accelerators 306, storage 308, application specific integrated circuit (ASIC) 310, persistent memory (PM) 312, and memory module 314. Various components of system 300 may be communicatively and/or electrically coupled with a CXL interface 316, which may be a port. Accordingly, communicative couplings indicated by an interface such as a CXL interface (and/or a PCI or other such interface, as described herein) may each include a corresponding port to establish a signal connection between the two components. Such connections may be indicated by a line with arrows on both ends in the Figures provided herein. Though reference may be made herein to such interfaces, it is appreciated that such references to interfaces may also include the corresponding port of the components (e.g., the ports of the corresponding cache coherent switch on chip). Additionally, other components of system 300 may be communicatively and/or electrically coupled with other interfaces 318, such as Peripheral Component Interconnect (PCI) and/or other such interfaces. Other such interfaces may be indicated by a line without arrows in the Figures provided herein.

Processor 304 may be any type of processor, such as a central processing unit (CPU) and/or another type of processing circuitry such as a single core or multi-core processor. Processor 304 may be a main processor of an electronic device. For the purposes of this disclosure, "processor," "CPU," "microprocessor," and other such reference to processing circuitry may be interchangeable. Thus, reference to one such component may include reference to other such processing circuitry. In various embodiments, an electronic device or system may include one or a plurality of processors 304. Each processor may include associated components, such as memory 314B. Memory 314B may, for example, be a memory module, such as a dual in-line memory module, and may provide memory for processor 304.

Cache coherent switch on chip 302 may be configured to allow for sharing of resources between various components of system 300, as described herein. Such components may include, for example, accelerators 306A and 306B, storage 308 (e.g., smart storage such as harddrives or memories such as solid state drives), ASIC 310, PM 312, and memory 314A. Accelerators 306A and 306B may be hardware or software configured to accelerate certain types of workloads and are configured to more efficiently perform such specific workloads. Storage 308 may be harddrives and/or other storage devices. ASIC 310 may be, for example, artificial intelligence ASICs and/or other such ASICs configured to perform specific tasks. PM 312 may be non-volatile low latency memory with densities that are greater than or equal to DRAM, but may have latencies that are greater than DRAM. Memory 314A may be, a memory module including random access memory (RAM) and/or another such memory.

In various embodiments, cache coherent switch on chip 302 may be communicatively coupled to one or more such components of system 300 via CXL interface 316. Cache coherent switch on chip 302 may be configured to allow for sharing of resources between the various such components. In certain embodiments, cache coherent switch on chip 302 may include its own resources, such as its own RAM module, as well as other such resources that are described herein. Such resources may also be shared between the various components. Cache coherent switch on chip 302 may utilize CXL interface 316 to provide low latency paths for memory access and coherent caching (e.g., between processors and/or devices to share memory, memory resources, such as accelerators, and memory expanders). CXL interface 316 may include a plurality of protocols, including protocols for input/output devices (IO), for cache interactions between a host and an associated device, and for memory access to an associated device with a host. For the purposes of this disclosure, reference to a CXL interface or protocol described herein may include any one or more of such protocols. Cache coherent switch on chip 302 may utilize such protocols to provide for resource sharing between a plurality of devices by acting as a switch between the devices.

Typically, all components of a system are controlled via a processor. Thus, component-to-component traffic is controlled by the processor. In such a configuration, the processor, due to limited resources, becomes a bottleneck in component-to-component traffic, limiting the speed of component-to-component traffic. The techniques and systems described, such component-to-component traffic is controlled via cache coherent switch on chip 302, with CXL interface 316, generally bypassing processor 304. As CXL interface 316 allows for an extremely low latency interface between components, processor 304 is no longer a bottleneck and sharing of resources may be performed more quickly and efficiently.

Figure 4:
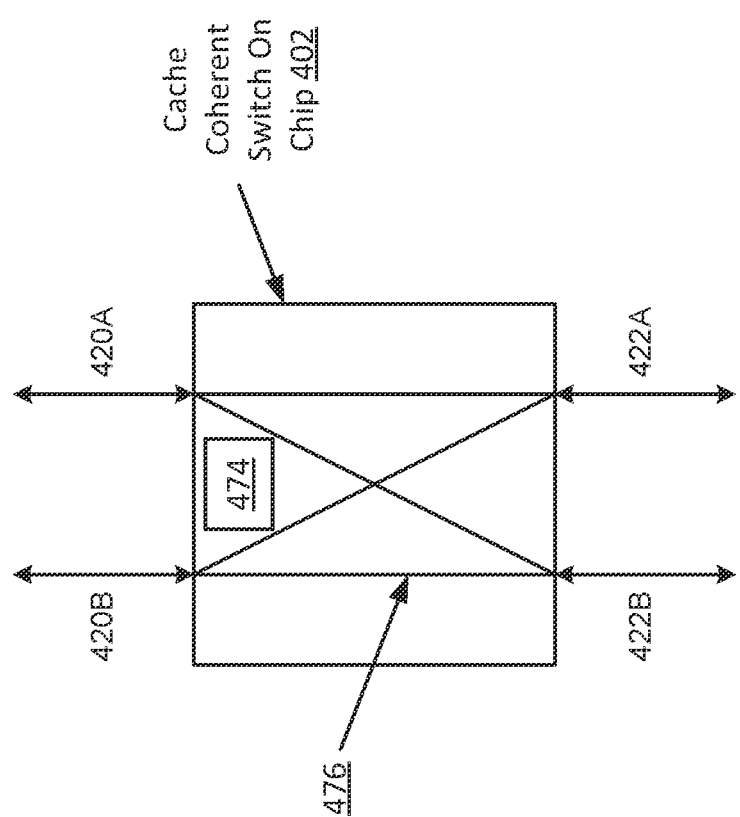
FIG. 4 illustrates a block diagram of an example cache coherent switch on chip, in accordance with some embodiments.

FIG. 4 illustrates a block diagram of an example cache coherent switch on chip, in accordance with some embodiments. FIG. 4 illustrates cache coherent switch on chip 402. Cache coherent switch on chip 402 includes one or more upstream ports 420 and one or more downstream ports 422. Each of upstream ports 420 and downstream ports 422 may be configured to support PCIe or CXL protocol. As such, upstream ports 420 and downstream ports 422 may be ports configured to support any combination of PCIe and/or CXL protocols.

In certain embodiments, one or more upstream ports 420 may be configured to support CXL protocols while one or more downstream ports 422 may be configured to support PCIe and CXL protocols. In another embodiment, one or more upstream ports 420 may be configured to support PCIe protocols while one or more downstream ports 422 may be configured to support CXL protocols. In a further embodiment, one or more upstream ports 420 may be configured to support PCIe protocols while one or more downstream ports

422 may be configured to support PCIe protocols. In yet another embodiment, one or more upstream ports 420 may be configured to support CXL protocols while one or more downstream ports 422 may be configured to support CXL protocols.

Cache coherent switch on chip 402 may include switched fabric circuitry 476 that includes a plurality of nodes and may interconnect a plurality of ports. Switched fabric circuitry 476 may be configured to receive input and/or provide output to the various ports. Accordingly, switched fabric circuitry 476 may be coupled to downstream ports 420, upstream ports 422, and/or other ports and/or portions of cache coherent switch on chip 402. Switched fabric circuitry 476 may be circuitry configured in a switched fabric manner, to allow for inputs and outputs to be interconnected and signals accordingly communicated.

Cache coherent switch on chip 402 may include processing core 474. Processing core 474 receives electrical signals from ports of cache coherent switch on chip 402 and transforms and/or outputs associated electrical signals to other ports of cache coherent switch on chip 402. Processing core 474 may be configured to transform signals from a first protocol to a second protocol, and/or may be configured to determine the appropriate port to output signals toward.

Figure 5:
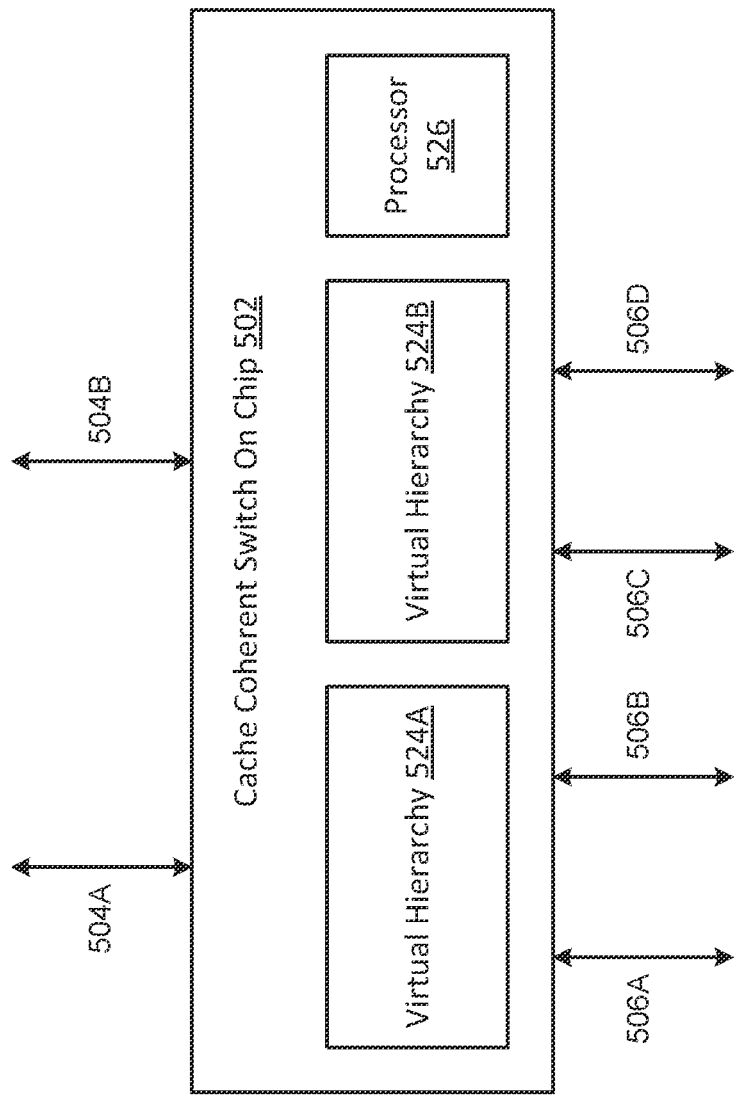
FIG. 5 illustrates a block diagram of another example cache coherent switch on chip, in accordance with some embodiments.

FIG. 5 illustrates a block diagram of another example cache coherent switch on chip, in accordance with some embodiments. FIG. 5 illustrates cache coherent switch on chip 502 that includes upstream ports 504 and downstream ports 506. Furthermore, cache coherent switch on chip 502 may include a plurality of virtual hierarchies 524 (e.g., virtual hierarchies 524A and 524B, as well as possibly additional virtual hierarchies) and processor 526. Each virtual hierarchy 524 may include a combination of PCIe and CXL protocols. Any combination of devices described herein may be coupled to upstream ports 504 and/or downstream ports 506, including memory devices, accelerators, and/or other such devices.

In various embodiments, a cache hierarchy may be determined and/or utilized by cache coherent switch on chip 502. The cache hierarchy may be, for example, a version of virtual hierarchy 524 and may indicate the priority for the caches of components coupled to cache coherent switch on chip 502. The cache hierarchy may indicate a priority for refreshing and/or reading/writing the caches of the various components. Such a cache hierarchy may be determined by cache coherent switch on chip 502 based on machine learning according to the techniques described herein and/or may be a preset hierarchy (e.g., a preset hierarchy of which caches of certain components are given priority and/or which components are given priority in utilization of the caches). In certain embodiments, such caches may be configured to fetch, read, and/or write data according to such hierarchy (e.g., higher priority components may be given priority for fetching, reading, and/or writing data to caches, according to the cache hierarchy).

In certain embodiments, one or more of upstream ports 504 and/or downstream ports 506 may include a bridge (e.g., a PCI-to-PCI bridge (PPB)) for coupling to the ports to devices. Furthermore, cache coherent switch on chip 502 may include one or more virtual bridges (e.g., vPPB) for binding to one or more components coupled to cache coherent switch on chip 502. In various embodiments, such bridges may additionally include bridges such as SR2MR (Single Root to Multiple Root), SLD2MLD (Single Logical Device to Multi Logical Device), and/or other such legacy bridges to provide for communications with legacy devices.

In certain embodiments, SR2MR bridges may be configured to allow a single root PCIe device to be exposed to multiple host ports. For SR2MR bridges, downstream ports may implement one or a plurality of virtual point-to-point (P2P) bridges. In certain embodiments, one virtual P2P bridge may be utilized for each virtual hierarchy. The SR2MR bridges may be a part of a switch on chip or may be a separate chip communicatively coupled to the switch on chip.

In certain embodiments, SLD2MLD bridges may be configured to allow a CXL standard single logical device to be seen as a multi logical device by the switch domain. Downstream ports implement address translation and enforces the isolation normally performed by multi logical devices. The SLD2MLD bridges may be a part of the switch on chip or may be a part of a separate chip communicatively coupled to the switch on chip.

Figure 6:
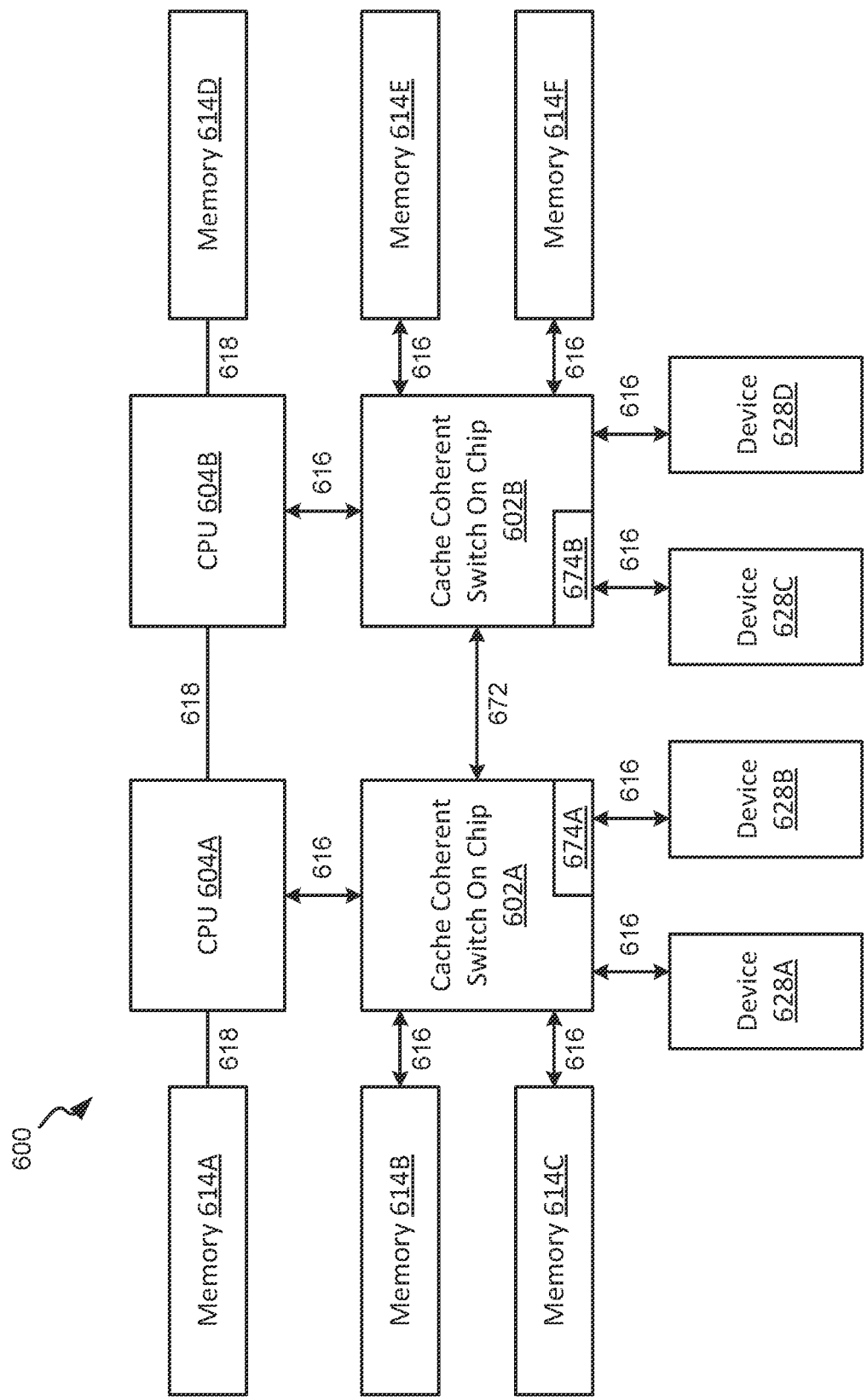
FIGS. 6-12 illustrate block diagrams of example systems, in accordance with some embodiments.

FIGS. 6-12 illustrate block diagrams of example systems, in accordance with some embodiments. FIG. 6 illustrates system 600 that includes a plurality of cache coherent switch on chips 602, CPUs 604, a plurality of memories 614, and a plurality of devices 628. While the embodiment shown in FIG. 6 illustrates a configuration where cache coherent switch on chip 602A is communicatively coupled (via CXL interface 616) to CPU 604A and cache coherent switch on chip 602B is communicatively coupled to CPU 604B, in various other embodiments, a single CPU may be coupled to both cache coherent switch on chip 602A and 602B. In various embodiments, CPU 604A and 604B may be communicatively coupled with interface 618. One or both of CPUs 604A and 604B may be in an active state or one of CPUs 604A and 604B may be demoted to a passive state. When in the passive state, the passive CPU may not control downstream devices 628 and, thus, control of such devices 628 may be exclusively controlled by the active CPU.

Cache coherent switch on chips 602A and 602B may be communicatively coupled via expansion port 672. In certain embodiments, cache coherent switch on chips 602 may include processing cores 674. Expansion port 672 may be a port on cache coherent switch on chips 602 to allow for expansion of processing power of cache coherent switch on chips 602 by, for example, allowing for interconnection of processing cores 674 (e.g., processing cores 674A and 674B). Expansion port 672 thus allows for increase in processing power and, in certain embodiments, expansion in the amount of component resources that may be shared. Accordingly, for example, memories 614B, 614C, 614E, and 614F as well as devices 628A to 628D may all be pooled resources for system 600. Memories 614 may be any type of appropriate memory described herein. One or more memories 614 may form a memory bank for portions of system 600, such as for one or more cache coherent switch on chips 602. Devices 628 may be any sort of device of a computing system, such as harddrives, graphics cards, ASICs, I/O devices, and/or other such devices. Furthermore, communicatively and/or electrically coupling together cache coherent switch on chips 602A and 602B may provide for greater system redundancy, increasing reliability.

Though the embodiment of FIG. 6 illustrates cache coherent switch on chips 602A and 602B being electrically and/or communicatively coupled between expansion port 672, other embodiments may couple various cache coherent switch on chips with other techniques, such as over a local area network (LAN), over the internet, and/or over another such network.

In certain embodiments, each of cache coherent switch on chip 602A and 602B may include their own virtual hierarchies. When coupled as in FIG. 6, the virtual hierarchies of one or both of cache coherent switch on chips 602A and 602B may be utilized for switching operations.

Figure 7:
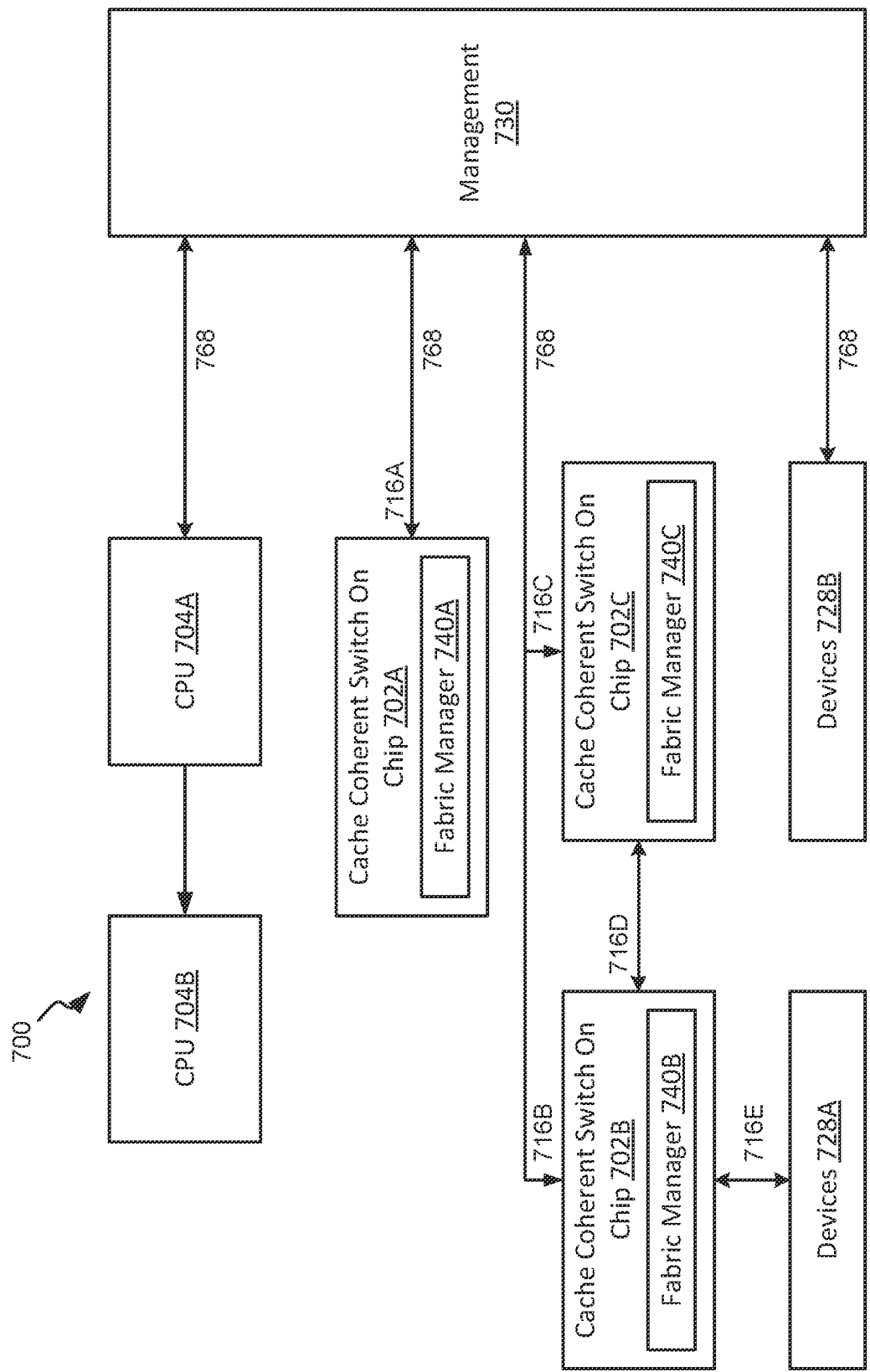

FIG. 7 illustrates system 700 that includes cache coherent switch on chips 702A to 702C, CPUs 704A and 704B, management 730, and devices 728. Each of cache coherent switch on chips 702A, 702B, and 702C may include their own individual virtual hierarchies. In certain embodiments, cache coherent switch on chips 702 may include a fabric manager or fabric agent 740 to manage resources connected to the ports (e.g., ports 716) of cache coherent switch on chips 702. The fabric manager 740 may connect to higher level management software entities (e.g., management 730) via Ethernet 768 (as, for example, Redfish over Ethernet) and/or another network or protocol (e.g., PCI protocols). Ethernet 768 may further communicatively and/or electrically couple cache coherent switch on chips 702A, 702B, and 702C and CPUs 704 and devices 728.

Fabric manager 740 may be configured to allocate and/or deallocate resources attached to the ports of cache coherent switch on chips 702 to applications running on such ports (e.g., to applications running on ASICs coupled to ports of cache coherent switch on chips 702). Fabric manager 740 may be configured to receive signals (e.g., data) from an upstream port and direct the signal to the appropriate downstream port. Various techniques for receiving and directing such signals (e.g., packet flows) are described herein. Fabric manager 740, as well as other firmware and/or software may further manage hot plug coupling by devices 728 to downstream CXL ports. Fabric manager 740 may also manage the inventory of various devices coupled to the ports of the respective cache coherent switch on chip 702.

Fabric manager 740 may be communicatively coupled to management 730 for top level management of system 700, including management of the various cache coherent switch on chips 702 described herein. Thus, in various embodiments, management 730 may be, for example, a baseboard management controller and/or another management device or server configured to provide management/orchestration. In various embodiments, management 730 may interface with fabric management 740 to provide for management of the various cache coherent switch on chips (e.g., via a specific fabric management API).

Fabric manager 740 may be implemented within firmware of cache coherent switch on chip 702 (e.g., within the firmware of a microprocessor of cache coherent switch on chip 702). Such firmware may include a system fabric manager that implements the logic for operations to be performed by switch hardware and other helper functions for implementing the API and a CXL fabric manager for implementing the front-end fabric manager APIs according to the CXL specifications.

In certain embodiments, a CXL single logical device (SLD), such as device 728A, may be hot-inserted into or hot-removed from cache coherent switch on chip 702B (e.g., via port 716E, which may be a PCIe and/or CXL protocol port). When such an SLD is first hot-inserted, it is assigned to fabric manager 740B. Diagnostics may be performed on the newly inserted SLD (e.g., either run as self-diagnostics by device 728A or run via diagnostics software on the processing core of cache coherent switch on chips 702). After the SLD has been determined to be ready, it can be assigned a VH of cache coherent switch on chip 702B based on policy (e.g., due to a virtual hierarchy) or via a command (e.g., from software within system 100).

The assignment may include binding the corresponding downstream PPBs of a cache coherent switch on chip 702 to one of the vPPBs, virtual hierarchies, and host port of cache coherent switch on chip 702. The managed hot-inserted device 728A is then presented to the host port after its assignment to the respective virtual hierarchy to allocate device 728A. The host CPU (e.g., the CPU within the respective cache coherent switch on chip 702) may then discover device 728A (e.g., via software), load software for device 728A and begin communicating with device 728A.

Figure 8:
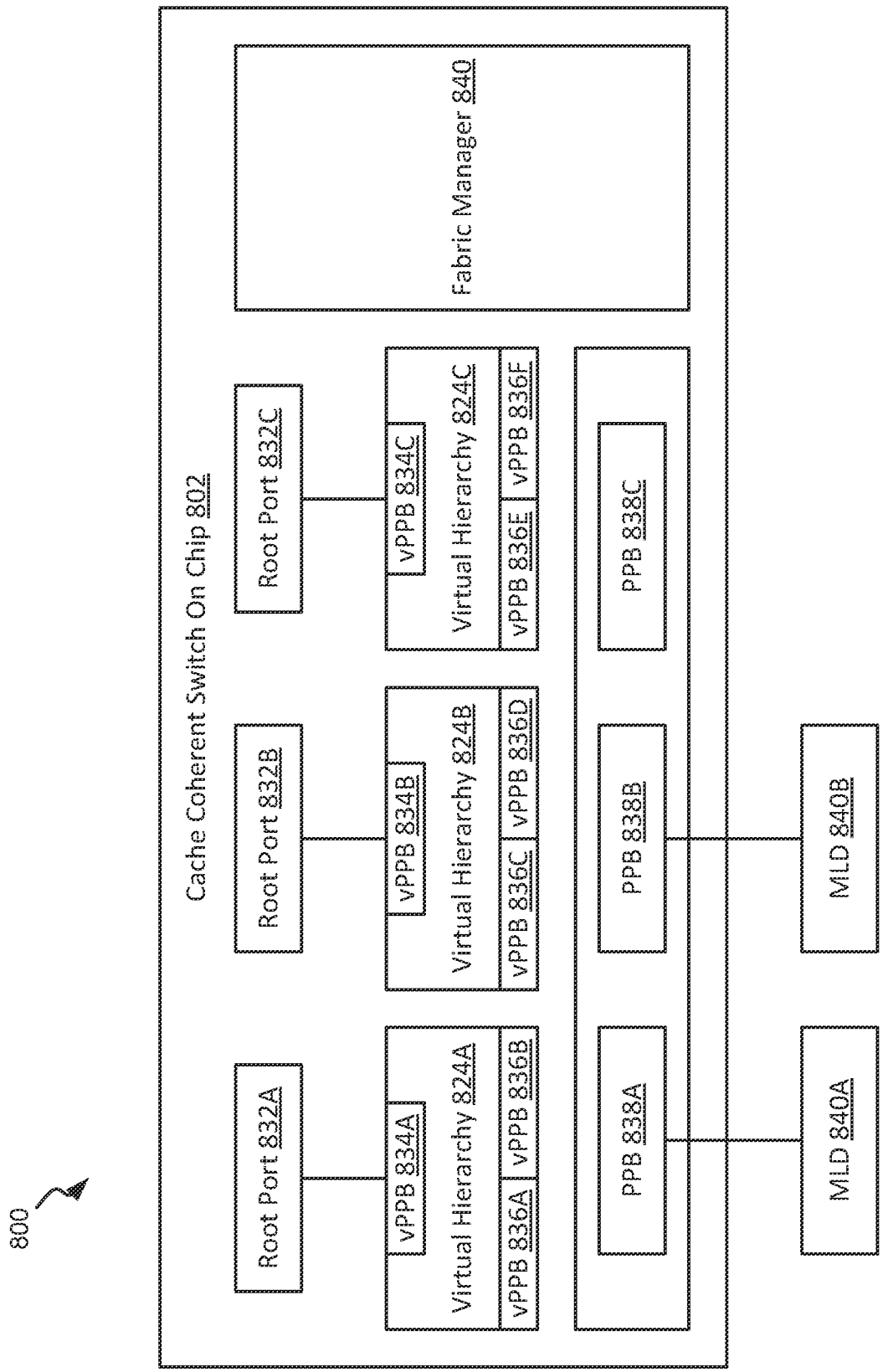

FIG. 8 illustrates system 800. System 800 may illustrate cache coherent switch on chip 802. Cache coherent switch on chip 802 may include a plurality of upstream ports 832 and a plurality of virtual hierarchies 824. The plurality of root ports 832 may include the ports described herein, as well as, for example, that of internal components within cache coherent switch on chip 802, such as microprocessors/ CPUs and/or other components. Each root port 832 may be assigned to downstream CXL protocol resources. Each virtual hierarchy 824 may include a plurality of vPPBs, where certain vPPBs 834 are associated with root ports 832 and other vPBBs 836 are associated with PPBs 838. Various multi-logical devices (MLDs) 840 may be coupled to downstream ports via certain PPBs 838.

Cache coherent switch on chip 602 may include a plurality of root ports 632. Such root ports 632 may include, for example, ports associated with a processing core of cache coherent switch on chip 602 as well as external devices. Root ports 632 may be assigned to downstream CXL resources, including embedded accelerators within system 600. Fabric manager 640 may include a processor (e.g., an ARM processor or another type of processor) and such a processor may be a part of one or more virtual hierarchies 624. Various downstream PPB ports 638 may be communicatively coupled to MLDs 640. The assignment of MLDs 640, as well as other components such as SLDs, memories, accelerators, and other such components, to certain PPBs 638 and vPPBs 636 may be controlled by fabric manager 640. Thus, fabric manager 640 may detect that a component has been coupled to a port of cache coherent switch on chip 602 and accordingly assign the component to the appropriate virtual hierarchy 624 (e.g., based on the detected type of the component). Furthermore, the appropriate PPB 638 and/or the vPPB 636 may be assigned to the component. In certain embodiments, such assignment may be based on the detected type of the component and on virtual hierarchy 624.

Figure 9:
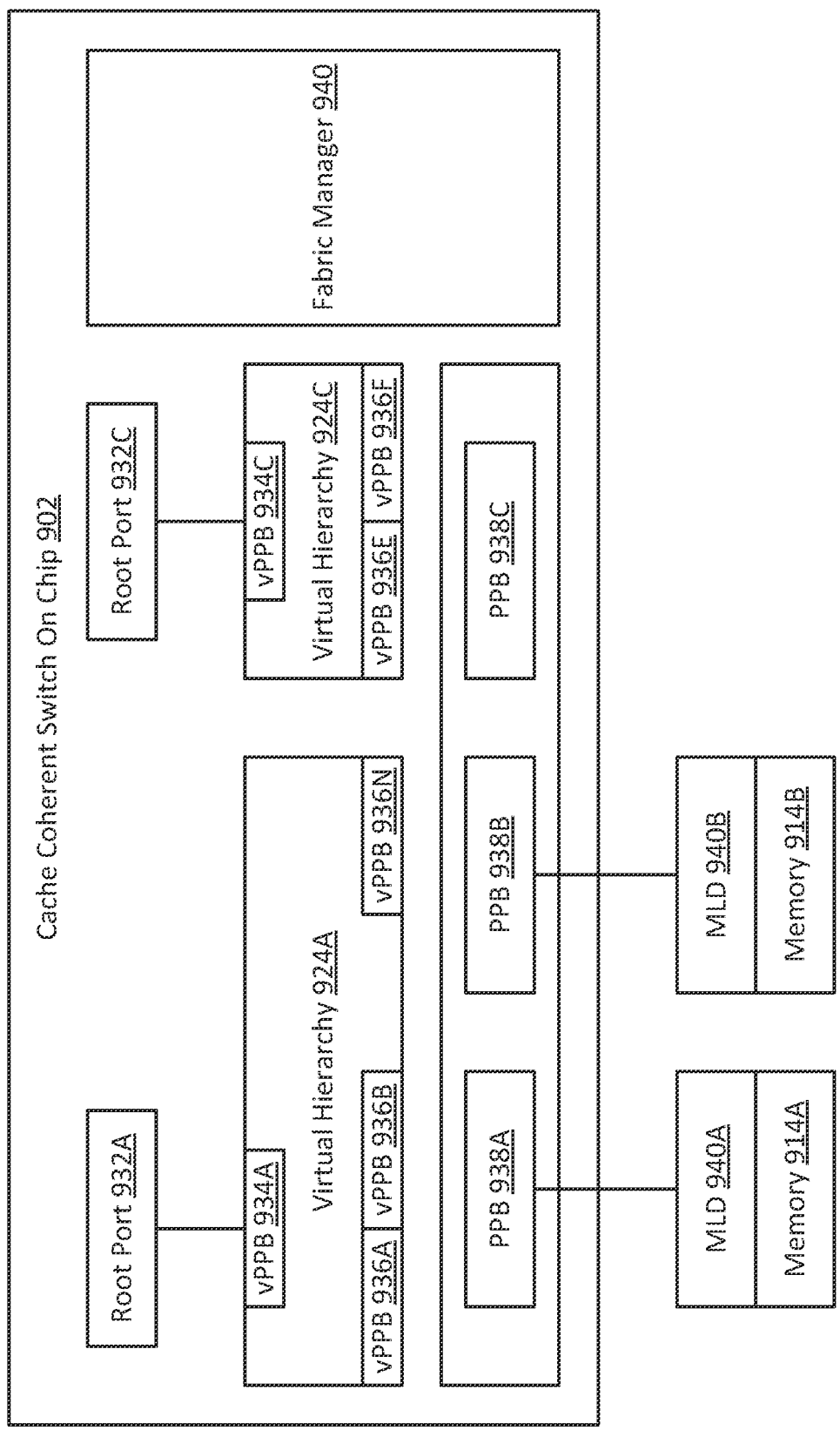

FIG. 9 illustrates system 900 that includes cache coherent switch on chip 902. As shown in FIG. 9, MLDs 940A and 940B are coupled to PPBs 938A and 938B, respectively. MLDs 940A and 940B include memories 914A and 914B, respectively, and are thus utilized as memory expansion. Coupling of memories 914A and 914B to system 900 allows for an increase in the amount of memory of system 900 (e.g., system 900 may be, for example, a single socket server).

In various embodiments, the amount of memory attached to a socket is limited by the number of channels that the socket supports. In certain situations, in a data-centric environment, an entire operating data set may not fit in a server's available memory, resulting in poor performance and increased latency when processing the data. Cache coherent switch on chip 902 addresses this problem by allowing for low-latency memory expansion due to memories 914A and 914B via the ports of cache coherent switch on chip 902, increasing the amount of memory available to a host CPU (beyond what could be connected directly to the CPU). Memories 914 may be DDR4, DDR5, future DDR, DRAM, PM, NVMe, and/or other such appropriate memory drives which may be expanded via CXL protocol through cache coherent switch on chip 902.

Such an ability of cache coherent switch on chip 902 is particularly beneficial in providing cost and performance advantages for memory intensive applications that would otherwise require a computing device with a large memory footprint or result in poor performance in a less expensive computing device with limited memory.

Figure 10:
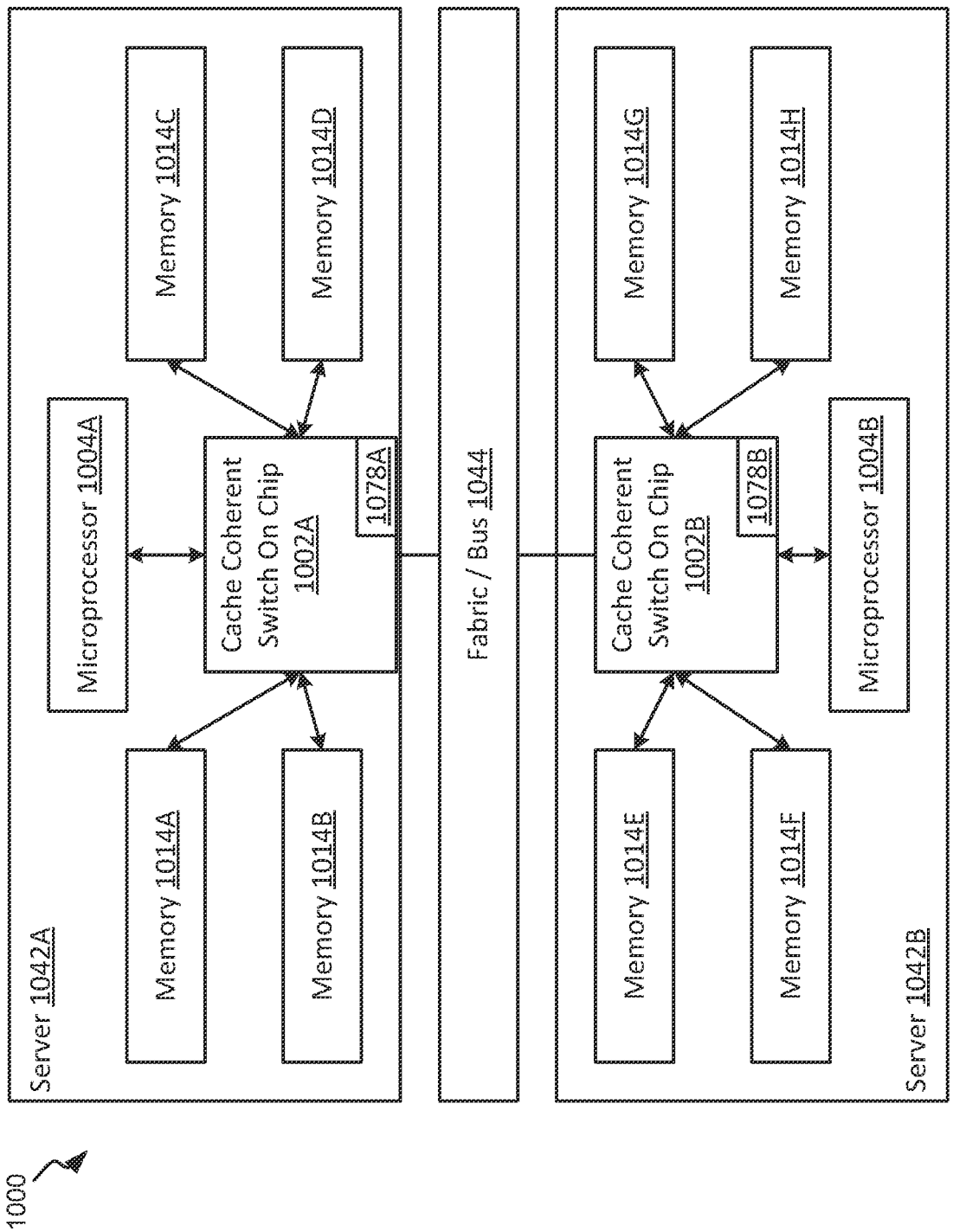

FIG. 10 illustrates system 1000 that includes a plurality of servers 1042A and 1042B. Each server 1042 may include its own cache coherent switch on chip 1002, a plurality of memories 1014 communicatively coupled to each cache coherent switch on chip 1002, and a microprocessor 1004 communicatively coupled to each cache coherent switch on chip 1002. Cache coherent switch on chip 1002A and 1002B may be communicatively coupled via fabric switch/bus 1044. In various embodiments, fabric switch/bus 1044 may be, for example, a switch fabric, a bus bar, and/or another such technique for communicating signals between different server devices.

As illustrated in FIG. 10, memories may be pooled between different microprocessors 1004. Such memories may include memories 1014 communicatively coupled to cache coherent switch on chips 1002 and/or memory that is socket connected to various microprocessors 1004. Thus, cache coherent switch on chips 1002 may allow for pooling of memory and other resources (e.g., AI, ASICs, GPUs, SNICs, NVMe, storage, and/or other such resources) between servers 1042 that are communicatively coupled via switch fabric/bus 1044. As signals communicated between switch fabric/bus 1044 may be similar to that of signals communicated within a single server device, cache coherent switch on chips 1002 may allow for sharing of such resources in a similar manner to that described herein. In various embodiments, a plurality (two or more) of servers 1042 may, accordingly, pool memory resources such as DRAM, PM, and/or other such memories. Such resources may be shared over fabric switches for memory pooling inside a server, between servers within a server rack, between various servers and racks within a data center, and/or between data centers. In a further embodiment, messages may be passed between components in a manner similar to that of the sharing of resources. Such techniques allow for reduction in the communication of messages between various components, increasing the performance of, for example, AI or ML workloads on processors.

In various embodiments, cache coherent switch on chips 1002 may provide compression and/or decompression ability to conserve persistent memory as well as crypto ability to provide added security between transactions into and out of persistent memory.

In certain embodiments, a prefetched buffer scheme may be utilized at the memory source. Accordingly, in various embodiments, cache coherent switch on chips 802 may include memory prefetchers 1078. Memory prefetchers 1078 may be an intelligent algorithm run by the processing core of the cache coherent switch on chips 1002. Memory prefetchers 1078 may be an artificial intelligence (AI) or machine learning (ML) prefetcher configured to predict the addresses of future accesses to memories based on past access patterns by the hosts, and prefetch data from such memories for those addresses to store in DRAM buffers to reduce the latency of future accesses by the host applications. In certain embodiments, accelerators communicatively coupled to cache coherent switch on chip 1002 may also be configured to provide prefetching when pooling resources via cache coherent switch on chips 1002 between servers 1042A and 1042B.

In certain embodiments, disaggregated servers 1042 may pool memory and/or other resources across a midplane (e.g., bus 1044). Thus, for example, in a chassis or blade server, a large shared pool of memory on memory cards/blades is available to be used by server cards/blades (that could be lightweight servers, aka thin servers, with a minimal amount of their own memory connected to the CPU socket). Such memory pooling may provide cost and/or power consumption advantages by reducing the amount of unused memory and/or other resources in data center servers, as memory/resource pooling allows for greater flexibility and, thus, a lower requirement for fixed resources. Servers may also be more flexibly configured due to the advantages of resource sharing.

In a certain use case, current typical server systems may include 512 gigabyte (GB) or so of volatile memory in cloud service provider infrastructure. A portion of this memory is typically stranded due to lower memory utilization for all the applications. Additionally, certain cloud environments include highly memory intensive applications that require more than 512 GB of memory. Currently, for example, platforms allocate all the servers with 512 GB memory due to simplicity, stranding the memory resources in the majority of the servers in order to have enough capacity for edge use cases. The currently disclosed cache coherent switch on chips addresses this memory stranding problem by allowing for the sharing of CXL protocol persistent memory both inside the server system and to outside servers connected via a network.

Figure 11:
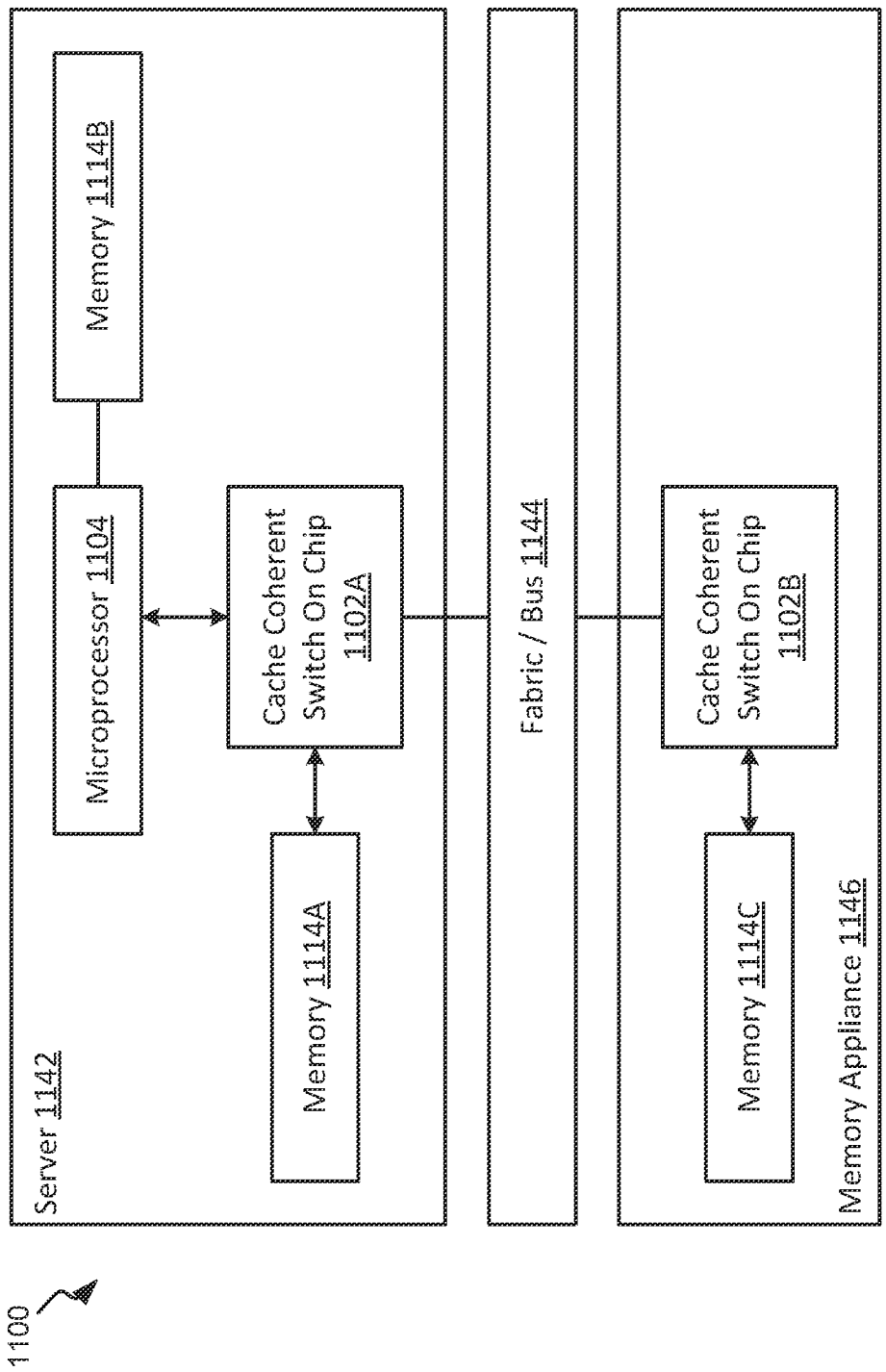

FIG. 11 illustrates system 1100 that includes server 1142, switch fabric/bus 1144, and memory appliance 1146. Memory appliance 1146 may be a shared or expansion memory for server 1142. System 1100 allows for memory 1114A of cache coherent switch on chip 1102A to be declared as a cache or pre-fetch buffer for persistent memory ports (e.g., ports coupled to switch fabric/bus 1144 and, thus, memory 1114C of memory appliance 1146). Utilizing memory 1114A as a read/write buffer hides the access time of utilizing memory appliance 1146 and, thus, memory 1114C.

In various embodiments, there may be both write and read flows for memory 1114A. In a write flow, microprocessor 1104 may indicate that writes on memory 1114A are steered to a DRAM buffer port of cache coherent switch on chip 1102A. For such writes, cache coherent switch on chip 1102A may check to ensure that memory 1114C is configured to provide buffer write/read commands to memory 1114A, allowing for memory 1114A to be used as a buffer for memory 1114C. Thus, memory 1114C is updated so that the buffer write/read address of memory 1114C refers to that of memory 1114A. Memory 1114A may then be accordingly utilized as a buffer for memory 1114C, avoiding the increase in access time of utilizing memory appliance 1146.

In certain embodiments, for a read flow, microprocessor 1104 may first query the buffer port of memory 1114A for the wanted data. If such data is present within the buffer of memory 1114A, the data may be provided to microprocessor 1104. If memory 1114A does not include such data, memory 1114C may be queried and the requested data may be provided from memory 1114C over switch fabric/bus 1144.

In certain embodiments, the cache buffers of memory 1114A include AI/ML prefetch algorithms. The algorithm is configured to predict the next set of addresses (expected to be fetched by the applications) and configures a direct memory access (DMA) engine to prefetch those addresses and store the data in read/write buffers, to be ready to be read by the applications. In certain embodiments, cache coherent switch on chip 1102A is configured to keep statistics of hit ratios for each line that was prefetched to provide feedback to the algorithm for continuous improvement (e.g., to determine which prefetched data has been utilized).

In certain embodiments, cache coherent switch on chip 1102A may provide instructions for operation of the memory prefetcher. Thus, cache coherent switch on chip 1102A may be configured to determine data to be prefetched (e.g., based on the AI/ML prefetch algorithm) and provide instructions (via switch fabric/bus 1144) to memory 1114C to provide such prefetched data to memory 1114A (via switch fabric/bus 1144) for caching. Memory 1114C may accordingly provide such data for buffering by memory 1114A.

In certain embodiments, each upstream port of cache coherent switch on chip 1102A is configured to determine whether a cache buffer port is assigned for the respective upstream port. If a cache buffer port is assigned, a further determination may be made as to which downstream port is assigned as the cache buffer port. Incoming traffic may then be accordingly provided to the assigned downstream port for cache buffer purposes.

In various embodiments, caching may be performed by memory of the switch on chip and/or memory attached to the ports of the switch on chip. Variously, cache coherent switch on chip 1114A may determine whether requested data is within the cache and retrieve such data if it is present within the cache. If the data is not within the cache, a request may be provided to the coupled persistent memory for the data and the data may be accordingly provided. In certain embodiments, write requests may be provided to both the cache and the persistent memory.

Figure 12:
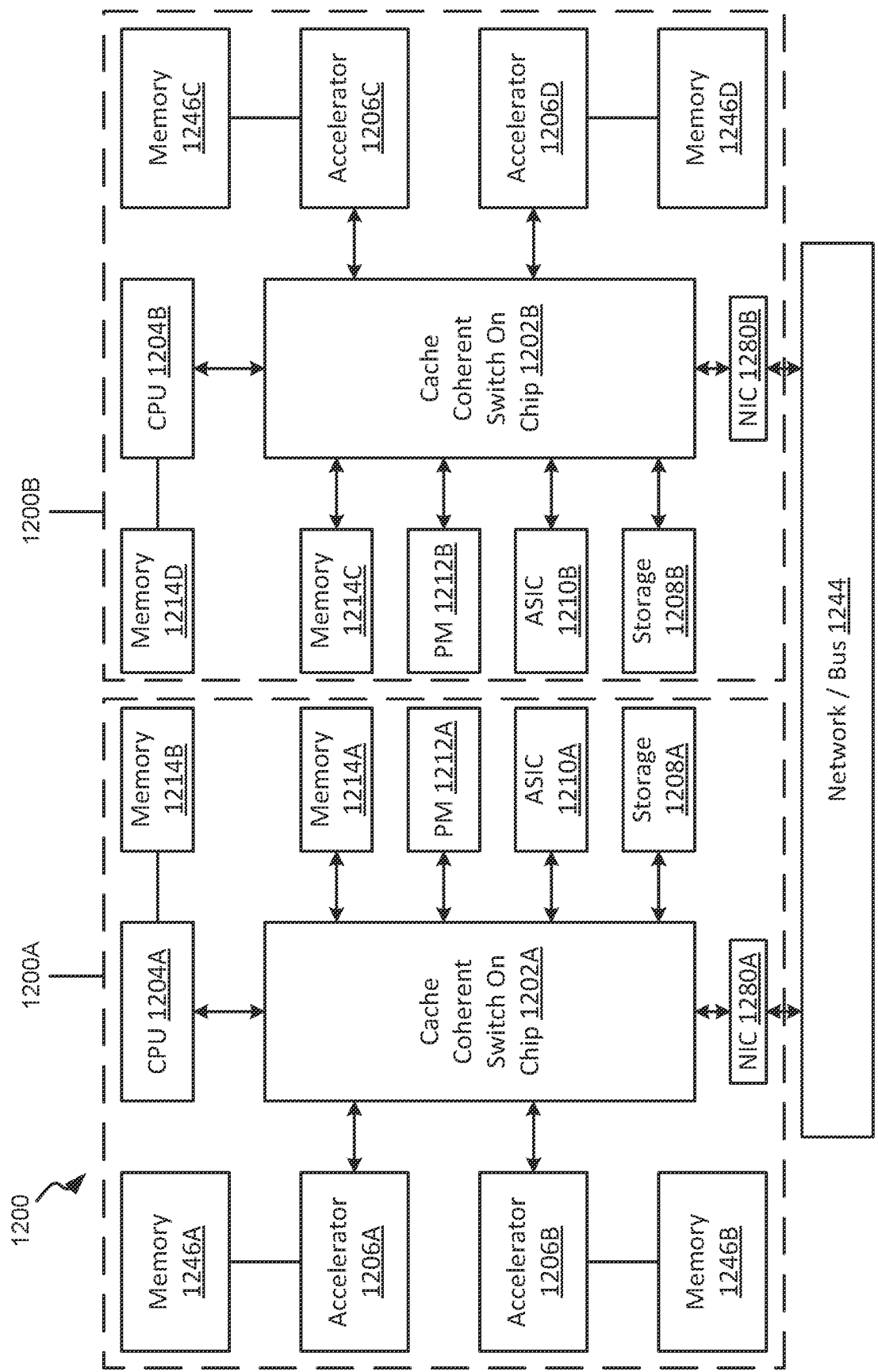

FIG. 12 illustrates system 1200 that includes servers 1200A and 1200B. Each server 1200A/B includes a cache coherent switch on chip 1202, each cache coherent switch on chip 1202 communicatively/electrically coupled to CPU 1204, accelerator 1206, storage 1208, ASIC 1210, PM 1212, memory 1214, and network interface card (NIC) 1280. Each accelerator 1206 may include respective memory 1246, which may include its own cache coherent and non-cache coherent storage. Cache coherent switch on chips 1202A and 1202B may be communicatively coupled via network/bus 1244 via NICs 1280A and 1280B. FIG. 12A may illustrate a configuration where a cache coherent switch on chip of a first server may bridge over Ethernet to another cache coherent switch on chip of a second server and allow for the sending and receiving (and, thus, reading and writing) of cache coherent traffic directly between NIC 1280 and accelerator 1206's cache coherent memory, via cache coherent switch on chip 1202.

In various embodiments, cache coherent switch on chips 1202A and 1202B may be communicatively coupled via an Ethernet connection (e.g., via network 1244). As such, cache coherent switch on chips 1202 may communicate via CXL protocol through Ethernet to allow for resource pooling and/or sharing (e.g., of memory, accelerators, and/or other devices) between different devices, server racks, and/or data centers.

In various embodiments, commands received from a host via a CXL protocol port of cache coherent switch on chips 1202 are received and terminated inside the respective cache coherent switch on chips 1202 at the CXL protocol port. Cache coherent switch on chip 1202 may then provide a corresponding command tunneled within the payload of Ethernet frames that are communicated over network 1244. Thus, cache coherent switch on chip 1202 includes a bridging function that is configured to terminate all the read and write commands (e.g., persistent memory flush commands) inside cache coherent switch on chip 1202 and provide corresponding commands over Ethernet.

NICs 1280 may be configured to allow for cache coherent switch on chips 1202s to communicate via network/bus 1244. In certain embodiments, cache coherent switch on chips 1202 may be provided for data flow between accelerators 1206 and NICs 1280 (which may be a Smart NIC) so that NICs 1280 may write directly into accelerator 1206's cache coherent memory. Such data flow allows for sending and/or receiving of cache coherent traffic over network 1244 by accelerators 1206.

The configuration of system 1200 allows for data to be communicated between components within servers 1200A and 1200B as well as between servers 1200A and 1200B without needing to be controlled by CPUs 1204. Furthermore, the components of system 1200 are decoupled from each other, with traffic controlled by respective cache coherent switch on chips 1202.

In a certain embodiments, system 1200 may be configured so that cache coherent traffic stays within respective servers 1200A and 1200B. Cache coherency within each server 1200A/B is resolved by respective CPU 1204. Cache coherent switch on chips 1202 may provide accelerator traffic over network 1244, but in certain such embodiments, such accelerator traffic may be non-cache coherent traffic. The cache coherent traffic is thus never exposed to network 1244.

In certain embodiments, (e.g., with processing core 474 within a cache coherent switch on chip, as described in FIG. 4), cache coherent switch on chips 1202 may be configured to resolve cache coherent traffic among accelerators 1206, as well as resolve cache coherency within CPU 1204. Thus, for example, cache coherent switch on chips 1202 may resolve symmetric coherency between two processing domains based on CXL protocol (e.g., allow for coherency between accelerator 1206 and CPU 1204). In various embodiments, the processing core within cache coherent switch on chip may receive and provide cache coherent traffic between the various components of system 1200, including accelerator 1206, CPU 1204, as well as other components. Thus, for example, all cache coherent traffic may be provided to cache coherent switch on chip 1202 and cache coherent switch on chip 1202 may then provide corresponding cache coherent traffic to respective target components. In such a configuration, CPU 1204 is no longer in charge of cache coherency, or the sole communicator of such data thereof. Instead, cache coherent switch on chip 1202 may resolve cache coherency between accelerator 1206 and any number of components within system 1200 (e.g., by determining that data received is cache coherency data and providing such coherency data to the respective components). Thus, for example, cache coherent switch on chip 1202 may include instructions to provide cache coherency data to one or more components for any received data. Such a configuration may reduce the cache coherency traffic between accelerators and CPUs, as well as other components within system 1200, increasing the performance of accelerator dominated ML/AI workloads by alleviating the bottleneck of CPUs. Such a configuration may also allow for cache coherency between different accelerators of multiple different systems, which are managed by their respective cache coherent switch on chips, increasing the total number of accelerators that are cache coherent in a given system and, thus, allow for a large batch of coupled accelerators for increased performance.

In a further embodiment of providing/receiving cache coherent traffic to accelerator 1206 over network 1244, NIC 1280 may indicate that it is providing cache coherent traffic to accelerator 1206. Upon receipt of such traffic, accelerator

1206 may provide the bias change of the coherent memory line to CPU 1204 (via cache coherent switch on chip 1202). Upon receipt, CPU 1204 may then provide snoop requests to all components (e.g., components snooping for cache coherency) within its respective server (e.g., that of server 1200A or 1200B) to provide for cache coherency within all components of the respective server. Once the cache line is resolved, CPU 1204 provides a line resolved message to the requesting accelerator 1206. Upon receipt of this message, accelerator 1206 may write the received traffic from NIC 1280 into the cache coherent portion of the respective memory 1246 of accelerator 1206 and, accordingly, coherency may be achieved within all components of the respective server.

Typically, accelerator to accelerator traffic within a system is provided via a proprietary switch. Cache coherent switch on chip 1202 allows for the elimination of such a proprietary switch while providing for accelerator to accelerator traffic. Accordingly, CXL protocol data may be provided from a first accelerator 1206A to a cache coherent switch on chip 1202, to CPU 1204A, and then communicated to a second accelerator 1206B to provide for cache coherency between the accelerators of server 1200A.

In various embodiments, CPU 1204 may include a home agent configured to resolve coherent traffic. Cache coherent traffic may be resolved by the home agent of CPU 1204. However, cache coherency may also be resolved within a processing core (e.g., a processing core such as processing core 474 of cache coherent switch on chip) of the cache coherent switch on chip, removing CPU 1204 as a bottleneck. Accordingly, such coherent traffic may be provided by one of accelerator 1206A and received by cache coherent switch on chip 1202A. The processing core of cache coherent switch on chip 1202A may then provide such coherent traffic to the other accelerators of the coherent group that are communicatively coupled to cache coherent switch on chip 1202A, such as accelerator 1206B, as well as other accelerators (e.g., communicatively coupled via network/bus 1244).

In a typical system, when data arrives from a network, typical data flows include network to processor, processor to storage, storage to processor, and processor to accelerator. As the volume of data grows, the processor becomes a bottleneck in this type of circular cycle of data transfer.

Cache coherent switch on chip 1202 allows for data to flow through to its ultimate destination while bypassing any CPU bottleneck. Thus, cache coherent switch on chip 1202 allows for data transfer between various ports, such as between two downstream ports. Components that are coupled to cache coherent switch on chip 1202 may, accordingly, more easily transfer data between each other and bypass CPU bottlenecks. Such transfers may be of the CXL protocol format.

For data transfers between accelerators and storage devices allocated to a root port of a microprocessor of cache coherent switch on chip 1202, the transfers may be cache coherent (e.g., controlled by the microprocessor of cache coherent switch on chip 1202), removing the need for cache coherency to be resolved by CPU 1204. Such a configuration provides for bandwidth and latency advantages as CPU 1204 may be bypassed and may be especially beneficial for neural networks, cryptocurrency, and/or other such systems where accelerators, ASICs, and/or other devices are primarily used (e.g., during training or mining).

In a first example, NIC 1280 may receive cache coherent traffic from network/bus 1244. The data may be accordingly provided to cache coherent switch on chip 1202 and provided to memory 1214. Memory 1214 may provide such cache coherent data to accelerator 1206 as well as to storage 1208. Thus, accelerator 1204, memory 1214, and storage 1208 may each include such coherent data. In various embodiments, accelerators 1206 may be a part of the virtual hierarchy of cache coherent switch on chip 1202 to allow for cache coherency between memory 1214 and accelerator 1206.

Each cache coherent switch on chip 1202 may be communicatively/electrically coupled with one or more of a plurality of accelerators 1206. As each cache coherent switch on chip 1202 may be communicatively/electrically coupled to one or more other cache coherent switch on chip 1202, the number of accelerators available to each of the communicatively/electrically coupled cache coherent switch on chips 1202 may be accordingly expanded across a network to encompass accelerators that are coupled to the plurality of cache coherent switch on chips 1202. Variously, cache coherent switch on chip 1202 may provide for such pooling regardless of whether the respective accelerator is assigned to CPU 1204 or a microprocessor of the cache coherent switch on chip 1202 (allowing for operation of the accelerator via cache coherent switch on chip 1202).

Thus, cache coherent switch on chip 1202 allows for creating and managing a pool of CXL protocol attached accelerators or other resources distributed across one or more cache coherent switch on chips 1202. In various embodiments, each cluster of communicatively coupled cache coherent switch on chips 1202 may include their own respective virtual hierarchies and cluster of resources. Resources within each cluster may communicate between each other accordingly as if all are connected to the same switch.

Resources within the pool (such as accelerators) may be allocated/deallocated to any application server inside a rack, aisle, data center, and/or any portion of networked data centers communicatively coupled via CXL protocol (including via CXL protocol over Ethernet or other networks). Applications servers may thus be provided with direct access to all accelerators within a cluster, removing all data transformations that are required in typical architecture (e.g., from CUDA code to RDMA protocol packets and back).

In certain embodiments, traffic passing through a first cache coherent switch on chip may be mirrored on a second cache coherent switch on chip. The mirrored traffic may then be utilized for, for example, analysis of traffic that is provided through the first cache coherent switch on chip.

Figure 13:
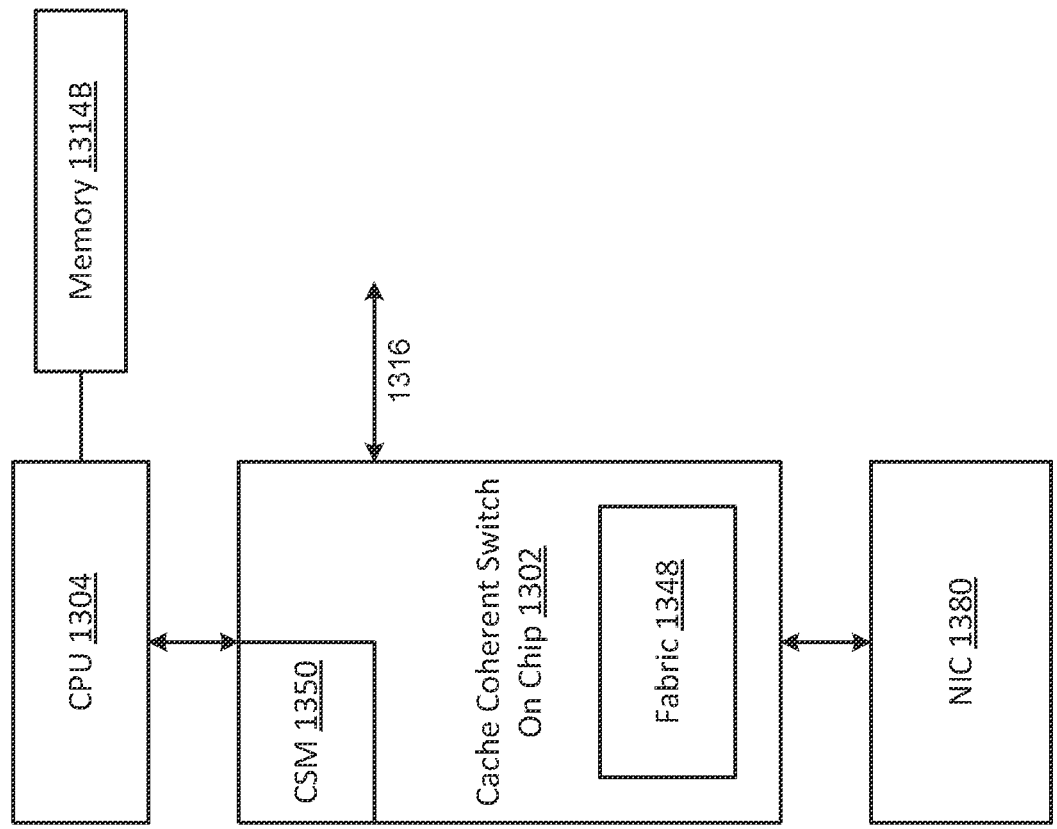
FIG. 13 illustrates a block diagram of an example cache coherent switch on chip with accelerator, in accordance with some embodiments.

FIG. 13 illustrates a block diagram of an example cache coherent switch on chip with accelerator, in accordance with some embodiments. FIG. 13 illustrates system 1300 that includes cache coherent switch on chip 1302, CPU 1304 with memory 1314B, and NIC 1380. Cache coherent switch on chip 1302 includes fabric 1348 and compression and security module (CSM) 1350. CSM 1350 allows for cache coherent switch on chip 1302 to perform compression and decompression for data received. Such a configuration provides significant advantages over conventional techniques, which typically include separate dedicated compression/decompression hardware that would require multiple data communication steps through the CPU to provide for compression and/or decompression and communication of such compressed and/or decompressed data.

In certain embodiments, after data arrives within cache coherent switch on chip 1302 from the network (e.g., via NIC 1380), the data is provided to CSM 1350 to be decrypted and/or decompressed. Once the data is decrypted and/or decompressed, such data is then provided to other components (e.g., target components of the data) through one or more ports of cache coherent switch on chip 1302. Additionally, when data is provided to cache coherent switch on chip 1102 to be provided to the network via NIC 1180, CSM 1150 may first encrypt and/or compress such data before memory buffering and/or providing such data to NIC 1180 (and, thus, the network).

Figure 14:
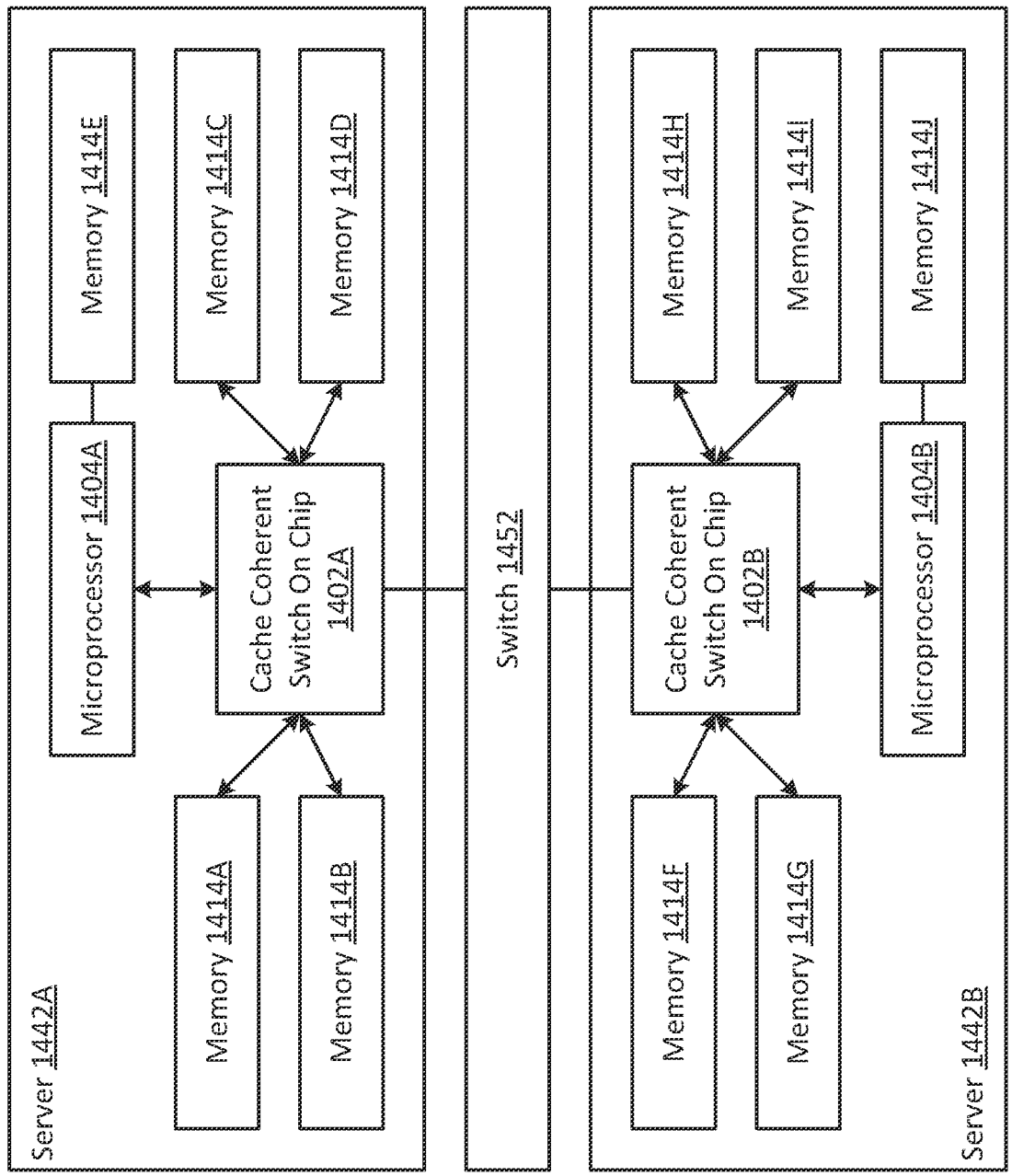
FIGS. 14-16 illustrate block diagrams of further examples, in accordance with some embodiments.
Figure 15A:
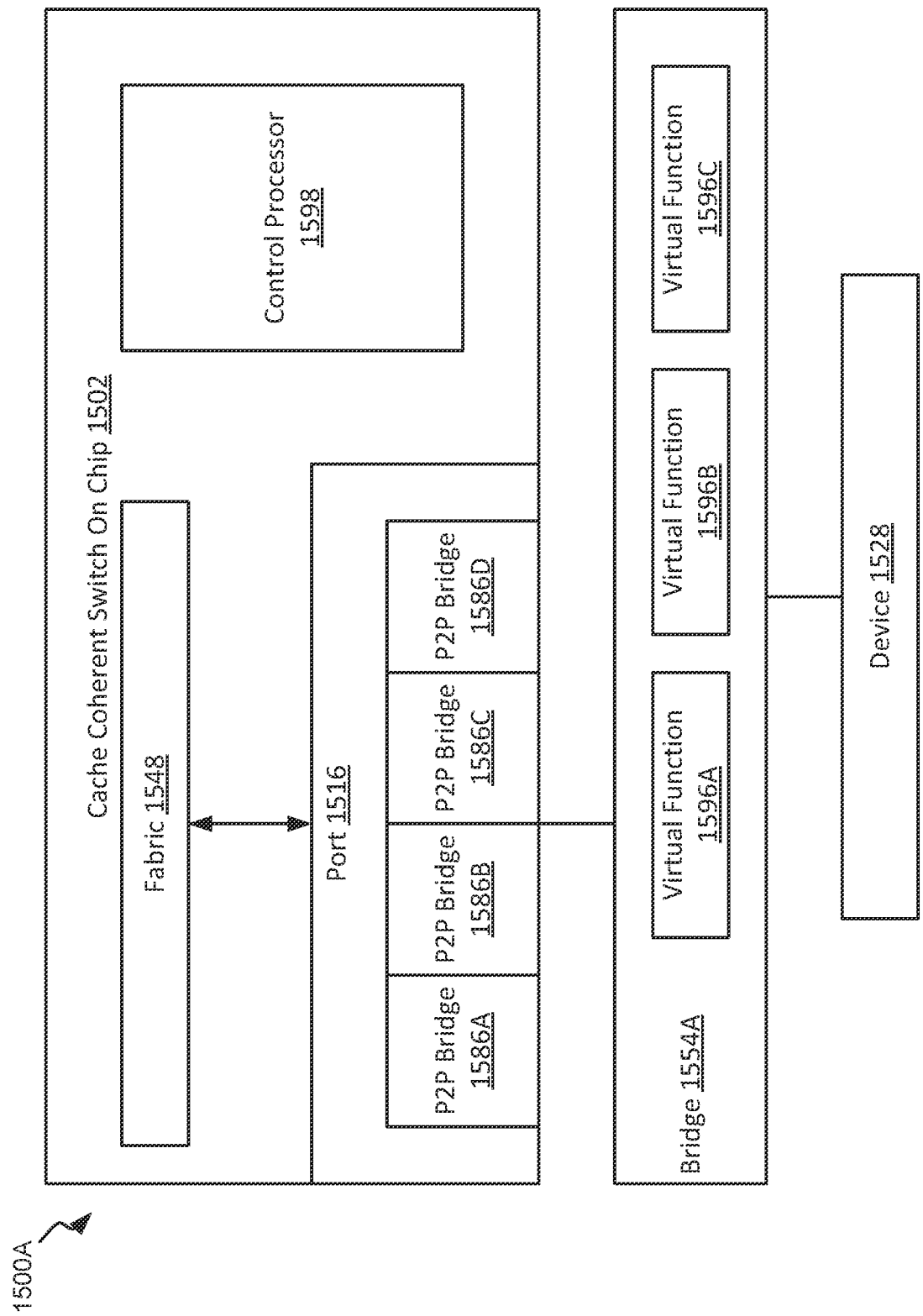
Figure 15B:
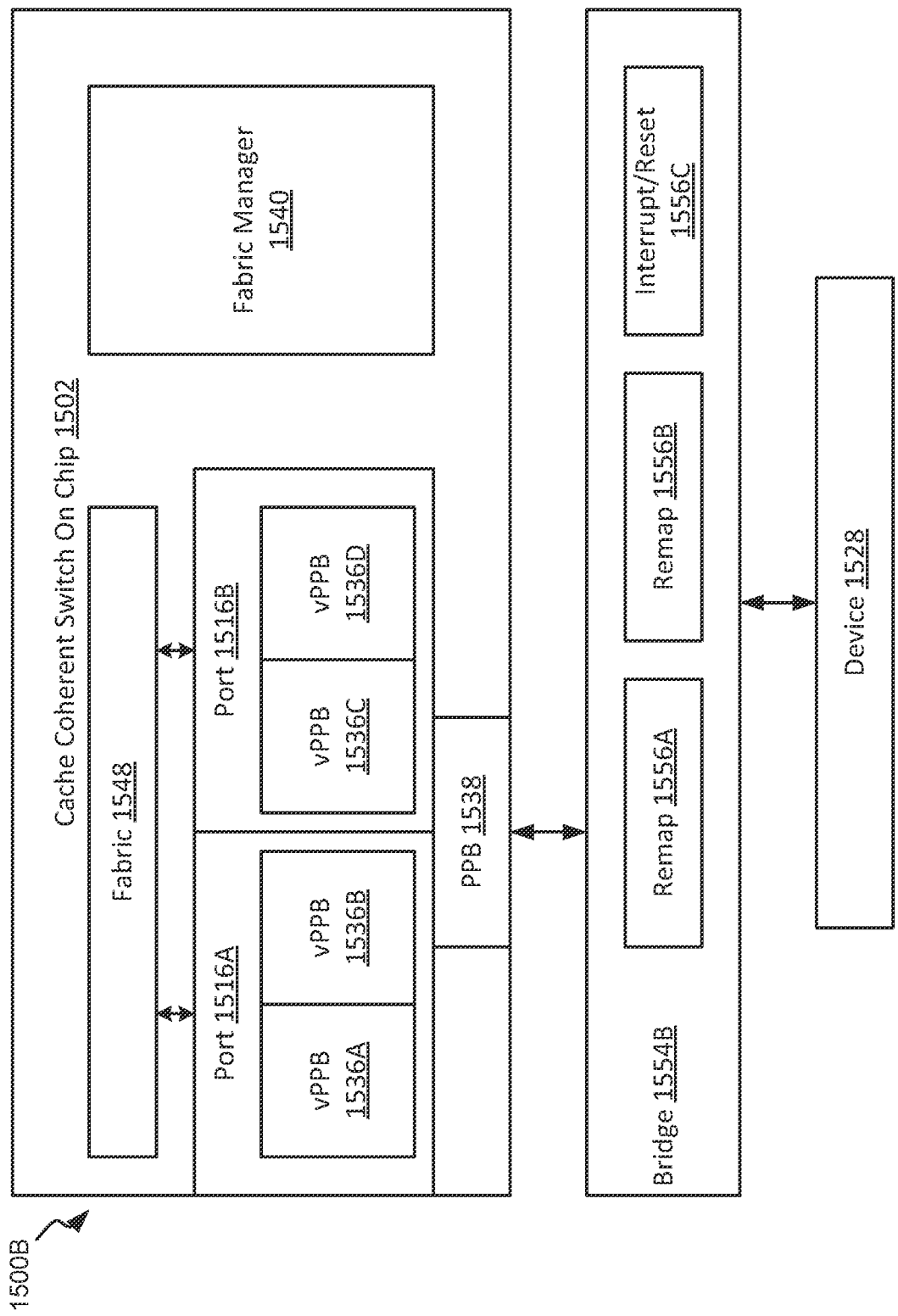
Figure 16:
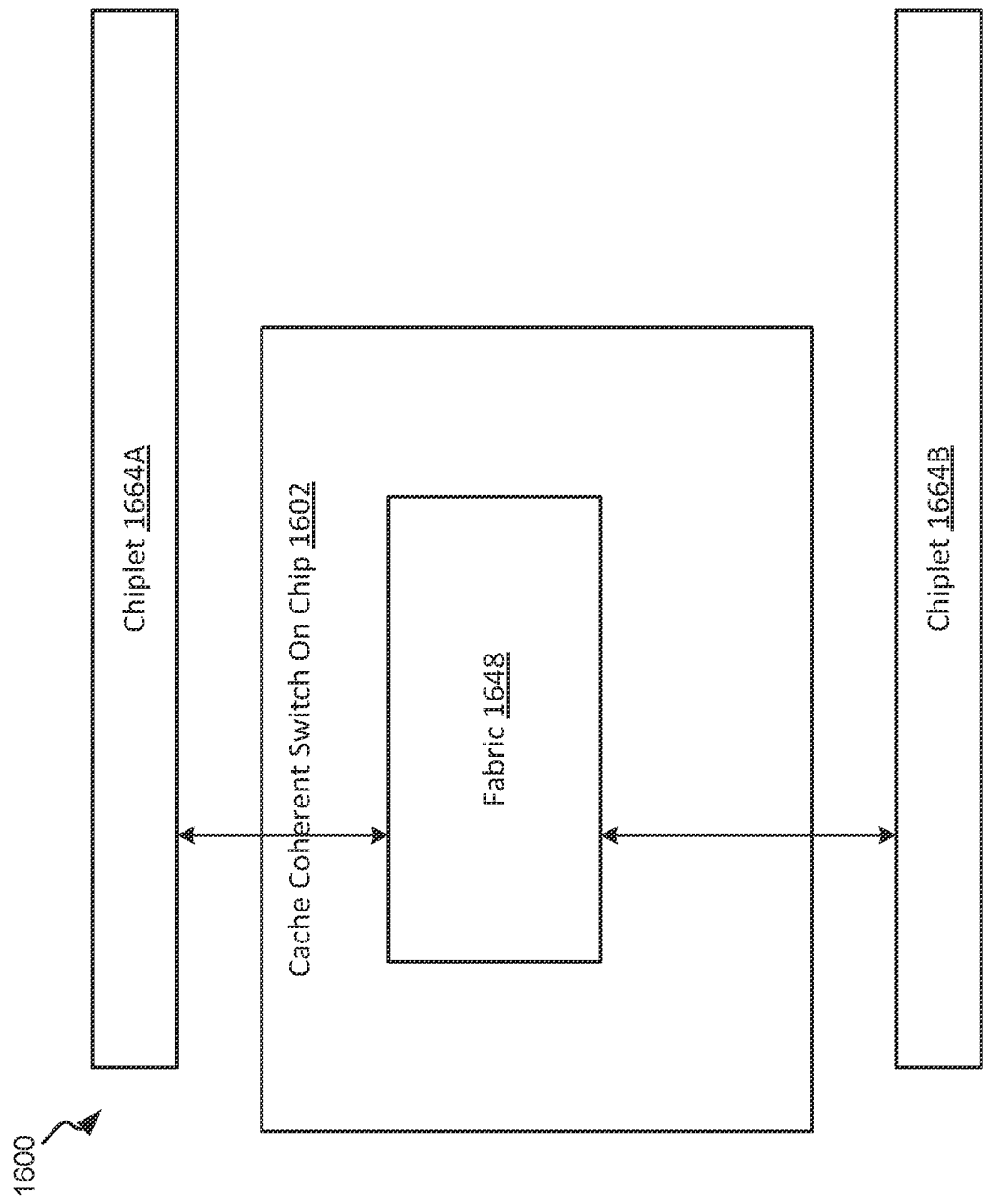

FIGS. 14-16 illustrate block diagrams of further examples, in accordance with some embodiments. FIG. 14 illustrates system 1400 that includes a plurality of servers 1442. Server 1442A and 1442B are communicatively coupled via switch 1452 (e.g., cache coherent switch on chips 1402A and 1402B of servers 1442A and 1442B, respectively, are communicatively coupled via switch 1452). In various embodiments, multiple such servers may be communicatively coupled via fabric switch. Coupling in such a manner may allow for such communicatively coupled servers (e.g., servers 1442A and 1442B) to pool resources such as CXL protocol or CPU socket attached memory, accelerators, and/or other such resources over fabric, increasing the amount of resources available to a system and increasing flexibility. In various embodiments, such resources may be pooled via software controlled, driver, or driver-less techniques.

In a certain instance, server 1442B may wish to share one or more of memories 1414F-J with server 1442A. Cache coherent switch on chip 1402A of server 1442A may then access the shared memory via CXL protocol memory commands. In certain embodiments, such CXL protocol memory commands may include read/write instructions and the key. Receiving such commands, cache coherent switch on chip 1402B may then perform the appropriate action (e.g., providing the read response for read commands or providing a write acknowledgement for write commands).

In other embodiments, two or more servers may be a part of the system. A local server may determine that requested data is not within its own buffer and may then communicate requests for the buffer data to each of the various servers. The various servers may provide erasure code, accordingly to the techniques described herein. The servers receiving the request may each determine whether its own caches include the requested data. Servers that include the data may then provide read responses to the requesting server and the requesting server may then receive erasure code data and replace the missing data blocks. Servers that do not include the data may provide read requests to corresponding memory, update the corresponding caches, and provide the data blocks to the requesting server. The requesting server may then reconstruct such data.

FIGS. 15A and 15B illustrate system 1500 that includes downstream bridges for supporting legacy devices. Systems 1500 of FIGS. 15A and 15B include cache coherent switch on chip 1502 and bridge 1554. Bridge 1554 may be, for example, a single root to multi root (SR2MR) or single logical device to multiple logical device (SLD2MLD) bridge. Bridge 1554 may be configured to expose a single device (e.g., device 1528) to multiple host ports.

In the embodiment of FIG. 15A, bridge 1554A may be a SR2MR bridge. In various embodiments, port 1516 may be communicatively coupled to bridge 1554A via a PCIe protocol. Bridge 1554A may be accordingly communicatively coupled to device 1528 via the PCIe protocol. Bridge 1554A may be implemented within cache coherent switch on chip 1502 or as a separate chip.

Bridge 1554A may include a plurality of virtual function assignments 1596A-C. Port 1516 may be coupled to device 1528 via bridge 1554A. Port 1516 may include a plurality of P2P bridges 1586A-D. Each virtual function 1596 may be associated with a corresponding P2P bridge 1586. Each virtual function 1596 may include address remap logic. In certain embodiments, port 1516 may implement physical function assignment logic to control processor 1598. Due to the matched virtual functions 1596 of bridge 1554A to P2P bridges 1586 of port 1516, device 1528 may be associated with a plurality of roots (e.g., multi-roots). The configuration of system 1500A may be utilized for single root devices and may provide for the implementation of multi-root devices while providing the security and isolation of separate virtual hierarchies.

In the embodiment of FIG. 15B, bridge 1554B may be a SLD2MLD bridge. Bridge 1554B may be implemented within cache coherent switch on chip 1502 or as a separate chip. Bridge 1554B may be communicatively coupled to PPB 1538 and, accordingly, vPPBs 1536. Bridge 1554B may provide a plurality of address remaps 1556A/B as well as provide for assignment logic such as for interrupts and resets with 1556C. Thus, single logic device 1528 coupled to bridge 1554B may be virtualized into a multi-logic device. A single logic device 1528 may be accordingly associated with a plurality of vPPBs 1536 and available as a resource and/or utilize resources from a plurality of other devices communicatively coupled to cache coherent switch on chip 1502. Utilizing the configuration of system 1500B, a single logic device may be shared and become, effectively, a multi-logic device and obtain the security and isolation benefits of a multi-logic device with a plurality of virtual hierarchies.

FIG. 16 illustrates system 1600 with cache coherent switch on chip 1602 with fabric 1648 of cache coherent switch on chip 1602 coupled to chiplets 1664. In certain embodiments, chiplet 1664 may be a memory controller chiplet that increases the efficiency and reduces the latency of memory. In other embodiments, chiplets 1664 may be other types of chiplets, such as AI inference engines, FPGAs, GPU accelerators, edge computing devices, and/or other such devices.

Figure 17:
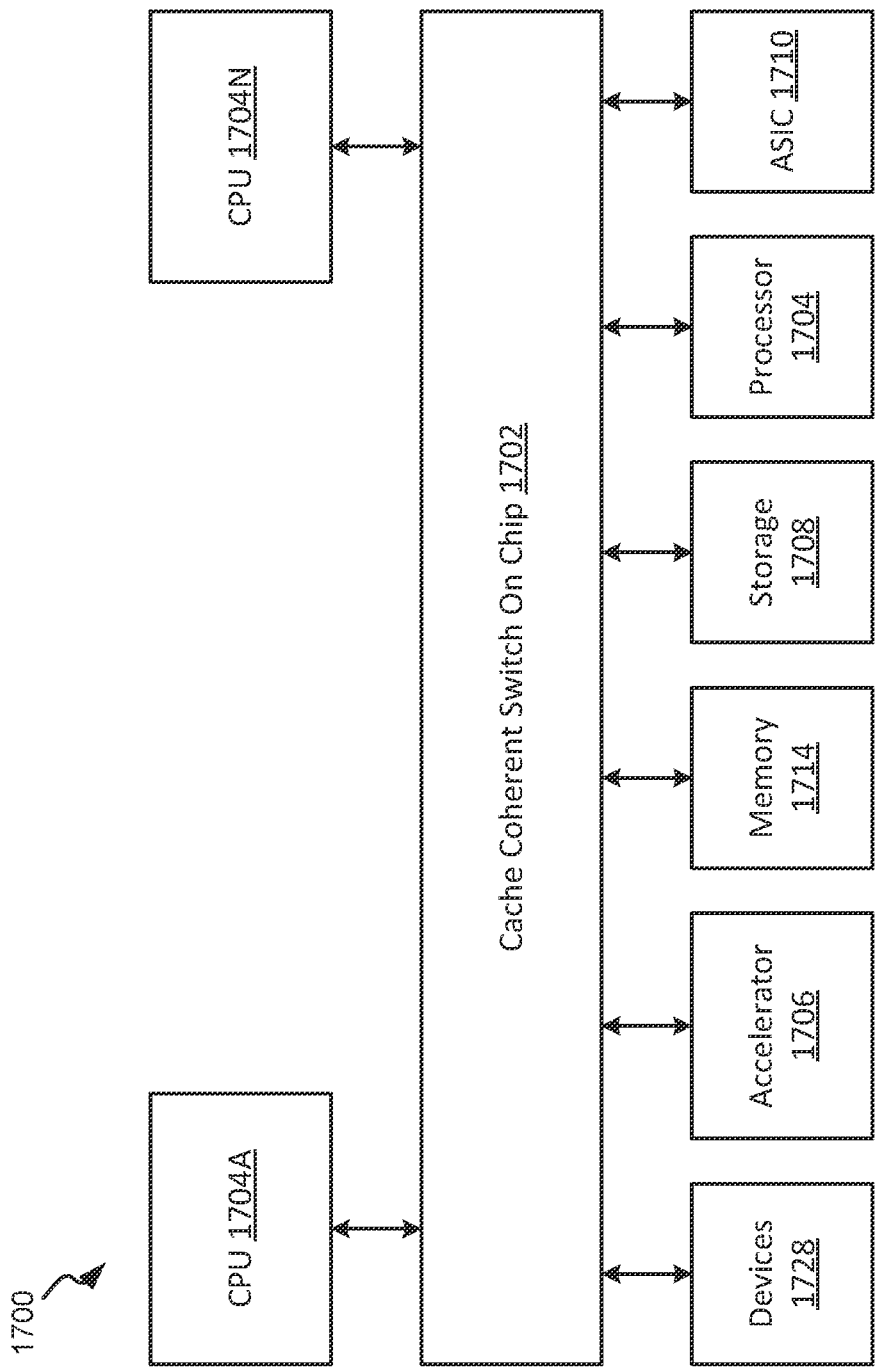
FIG. 17 illustrates a block diagram of an example computing system with a cache coherent switch on chip, in accordance with some embodiments.

FIG. 17 illustrates a block diagram of an example computing system with a cache coherent switch on chip, in accordance with some embodiments. FIG. 17 illustrates system 1700 that includes cache coherent switch on chip 1702. Cache coherent switch on chip 1702 may be communicatively coupled to a resource pool. The resource pool may include a plurality of CPUs 1704A-N, devices 1728, accelerator 1706, memory 1714, storage 1708, processor 1704, and ASIC 1710. Such communicative coupling may be via a CXL protocol. Such resource pools may be within a server, within a data center, and/or communicatively coupled via Ethernet, the Internet, and/or another data connection (e.g., Bluetooth or satellite Internet).

As described herein, cache coherent switch on chip 1502 may be configured to assign one or more resources from the resource pool to applications on demand. When the application no longer requires the assigned resources, the resources may be reallocated and made available for other applications.

Figure 18:
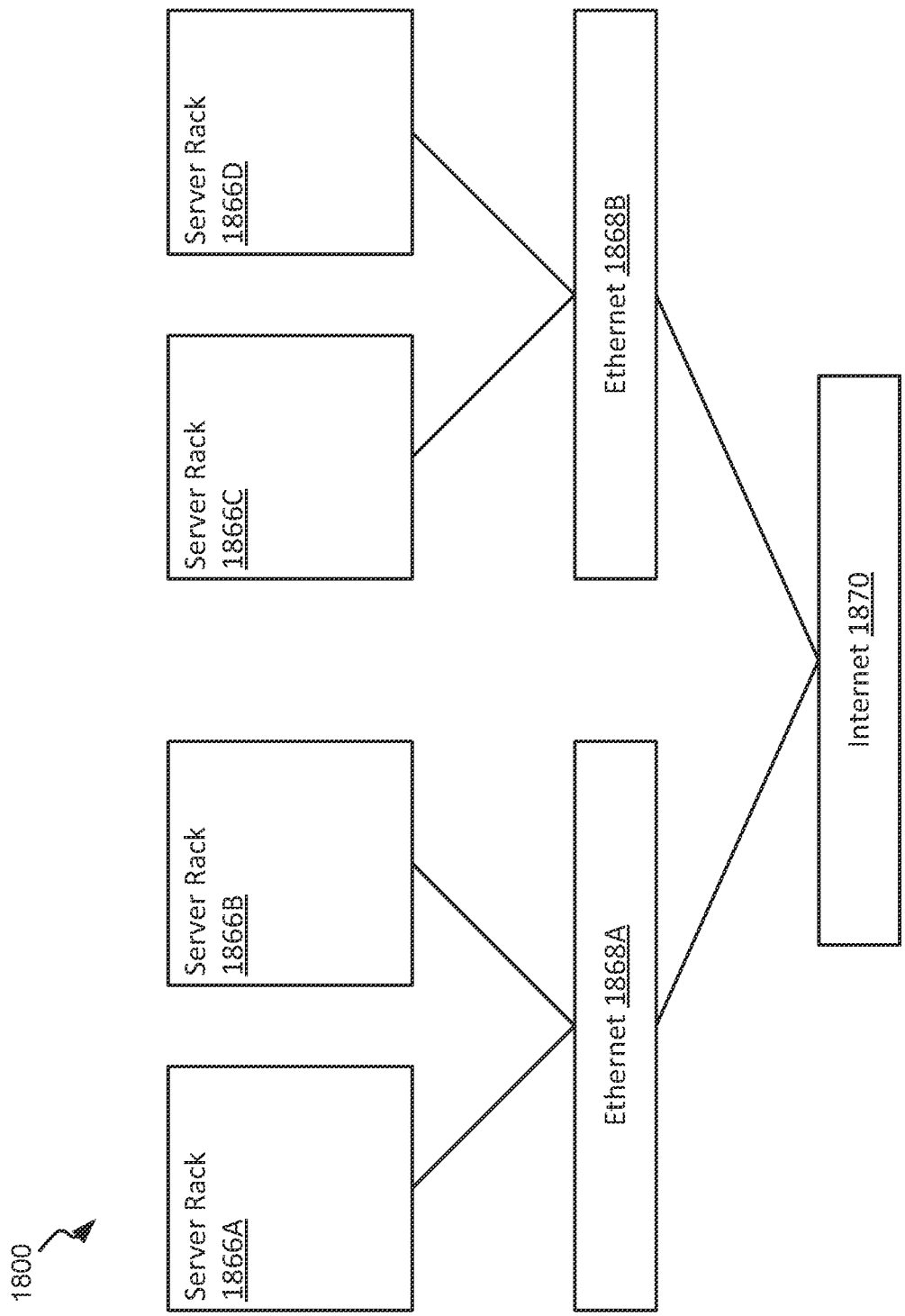
FIG. 18 illustrates a block diagram of a networked system, in accordance with some embodiments.

FIG. 18 illustrates a block diagram of a networked system, in accordance with some embodiments. Networked system 1800 may include a plurality of server racks 1866. Server racks 1866A and 1866B may be communicatively coupled via Ethernet 1868A and server racks 1866C and 1866D may be communicatively coupled via Ethernet 1868B. Ethernet 1868A and 1868B may be communicatively coupled via Internet 1870. Accordingly, server racks 1866A-D may all be communicatively coupled with each other.

Each of server racks 1866A-D may include their respective cache coherent switch on chips. Resource clusters may be created from devices communicatively coupled to the respective cache coherent switch on chips within a server rack (e.g., within one of server racks 1866A to D), from devices communicatively coupled via Ethernet 1868, from devices communicatively coupled via Internet 1870, and/or communicatively coupled via another technique. Accordingly, the cache coherent switch on chip disclosed herein allows for the creation of any resource cluster within a system, within a server rack, and across the server racks, creating completely fungible resources connected via a high speed CXL network or CXL protocol over fabric.

Figure 19:
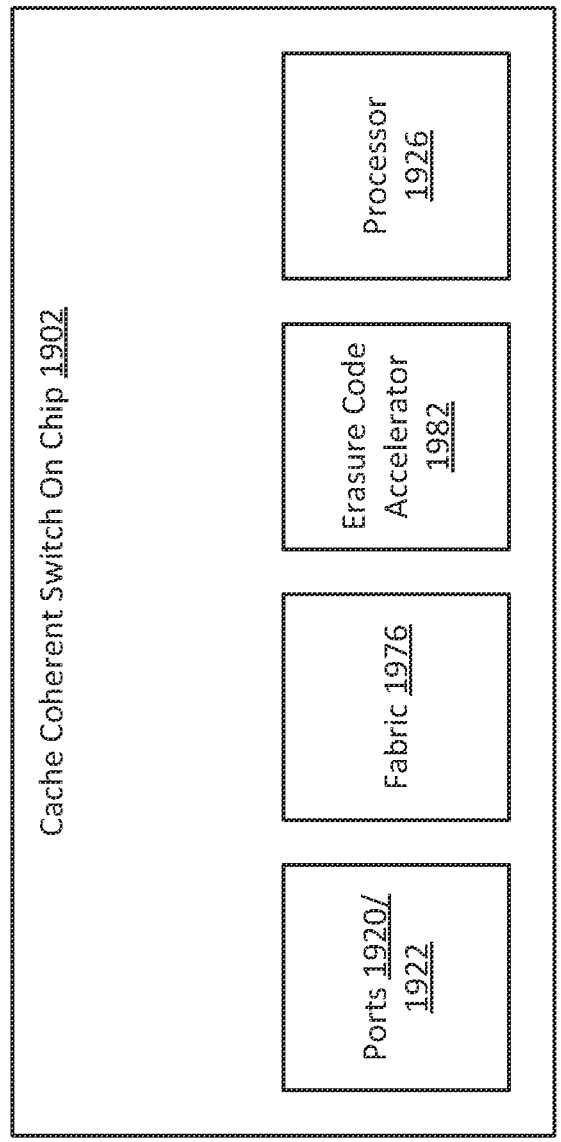
FIG. 19 illustrates a block diagram of an example cache coherent switch on chip with erasure code accelerator, in accordance with some embodiments.

FIG. 19 illustrates a block diagram of an example cache coherent switch on chip with erasure code accelerator, in accordance with some embodiments. FIG. 19 illustrates cache coherent switch on chip 1902 with ports 1920/1922, fabric 1976, erasure code accelerator 1982, and processor 1926.

Erasure code accelerator 1982 may provide redundancy for data stored in persistent memory, non-volatile memory, random access memory, and/or other such memory communicatively coupled to cache coherent switch on chip 1902 or across a network that cache coherent switch on chip 1902 is communicatively coupled to with other cache coherent switch on chips.

Thus, erasure code accelerator 1982 may be communicatively coupled to processor 1926 and/or to memory or storage communicatively coupled to ports 1920/1922. In situations where erasure code accelerator 1982 is communicatively coupled to processor 1926, erasure code accelerator 1982 may perform read/write requests addressed to processor 1926. Erasure code accelerator 1982 thus stripes data across one or more non-volatile memory on writes and reconstructs data from such memory during reads. In the event of a non-volatile memory failure, erasure code accelerator 1982 may support reconstruction of any lost data.

In certain embodiments, cache coherent switch on chip 1902 may receive a write data flow. For a write data flow received by cache coherent switch on chip 1902, a check may be performed to determine whether the write data is assigned a virtual end point (e.g., a memory or I/O device) in a virtual hierarchy. If the write is for the virtual end point, fabric 1976 may provide the data to processor 1926. Processor 1926 may then provide the write request to erasure code accelerator 1982, identifying the port associated with the request and the erasure code technique for use. Data may then read from various CXL protocol ports of cache coherent switch on chip 1902, allowing for erasure coding to be accordingly performed by erasure code accelerator 1982 by modifying the data and recalculating the erasure coded data. The modified erasure coded data is then written to the respective CXL port (e.g., the ports where the data is read from the various CXL protocol ports). Such a technique may conserve processing resources by offloading erasure coding to erasure code accelerator 1982.

Erasure code accelerator 1982 may also provide a read data flow. In a certain embodiment, ingress logic (e.g., for a read request from a port of cache coherent switch on chip 1902) determines whether the read data flow has erasure code implemented. If erasure code has been implemented, the read request may be provided to processor 1926. Processor 1926 may then provide the read request to erasure code accelerator 1982. The read request may identify the port (and, thus, the device communicatively coupled to the port) where the read request was received. The requested read data may then read from various CXL protocol ports of cache coherent switch on chip 1902, allowing for erasure coding to be accordingly performed by erasure code accelerator 1982 to prepare new erasure coded data. The erasure coded data is then provided back to the respective requesting CXL port.

The various accelerators of cache coherent switch on chip 1902 (e.g., compression, security, erasure coding, and/or other such accelerators) and processor 1926 of cache coherent switch on chip 1902 may be utilized for provisioning of computational storage services (CSSes) to applications running on host CPUs (e.g., CPUs of the greater system containing cache coherent switch on chip 1902). For example, processor 1926 and CSM modules may serve as computational storage processors (CSPs) to provide CSSes to attached hosts. Processor 1926 may also be utilized as the host in computational storage use cases, orchestrating data movement and running of CSSes. In certain embodiments, processor 1926 may offload batch processing of CSS commands from the host CPUs.

Figure 20:
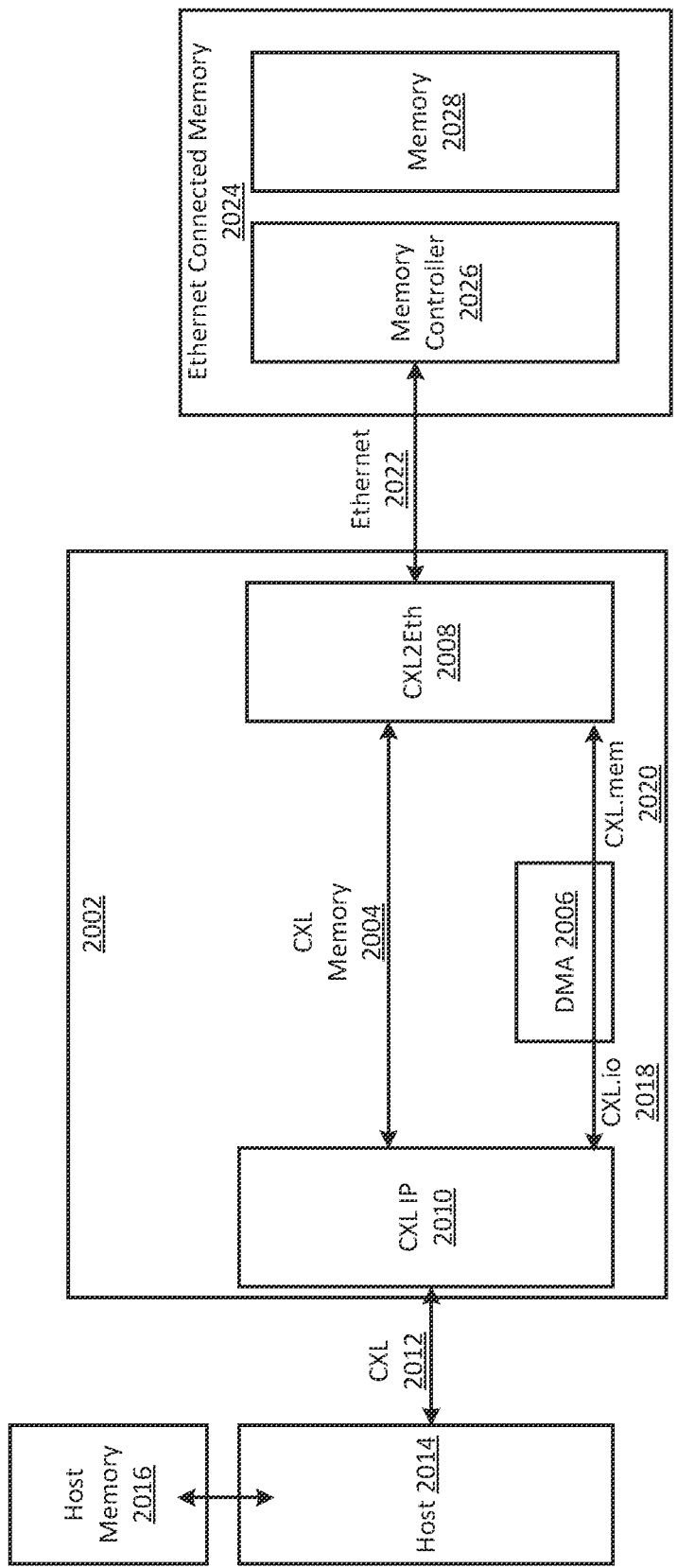
FIG. 20 illustrates a block diagram of a system, in accordance with some embodiments.

FIG. 20 illustrates a block diagram of a system, in accordance with some embodiments. FIG. 20 illustrates a system that includes CXL to Ethernet (CXL2Eth) Bridge 2002, Ethernet Connected Memory 2024, and host 2014. CXL2Eth Bridge 2002 includes direct memory access (DMA) 2006, CXL2Eth module 2008, and CXL IP 2010. CXL2Eth module 2008 and CXL IP 2010 may be communicatively coupled via CXL memory 2004 (a direct CXL memory connection) or via DMA 2006 through CXL2Eth 2008 providing a CXL.memory format data 2020, which is then converted into CXL.io (input/output) format data 2018.

CXL IP 2010 may be communicatively coupled to host 2014 via CXL format communications 2012. Host 2014 may include host memory 2016 and may be a host device as described herein. Host 2014 may access Ethernet Connected Memory 2024 via CXL2Eth Bridge 2002.

CXL2Eth 2008 may be communicatively coupled to Ethernet Connected Memory 2024 via Ethernet 2022. In certain embodiments, CXL2Eth 2008 may be communicatively coupled to memory controller 2026 of Ethernet Connection Memory 2024. Memory controller 2026 may provide access to memory 2028 of Ethernet Connected Memory 2024 (e.g., for host 2014), according to the techniques described herein.

Figure 21:
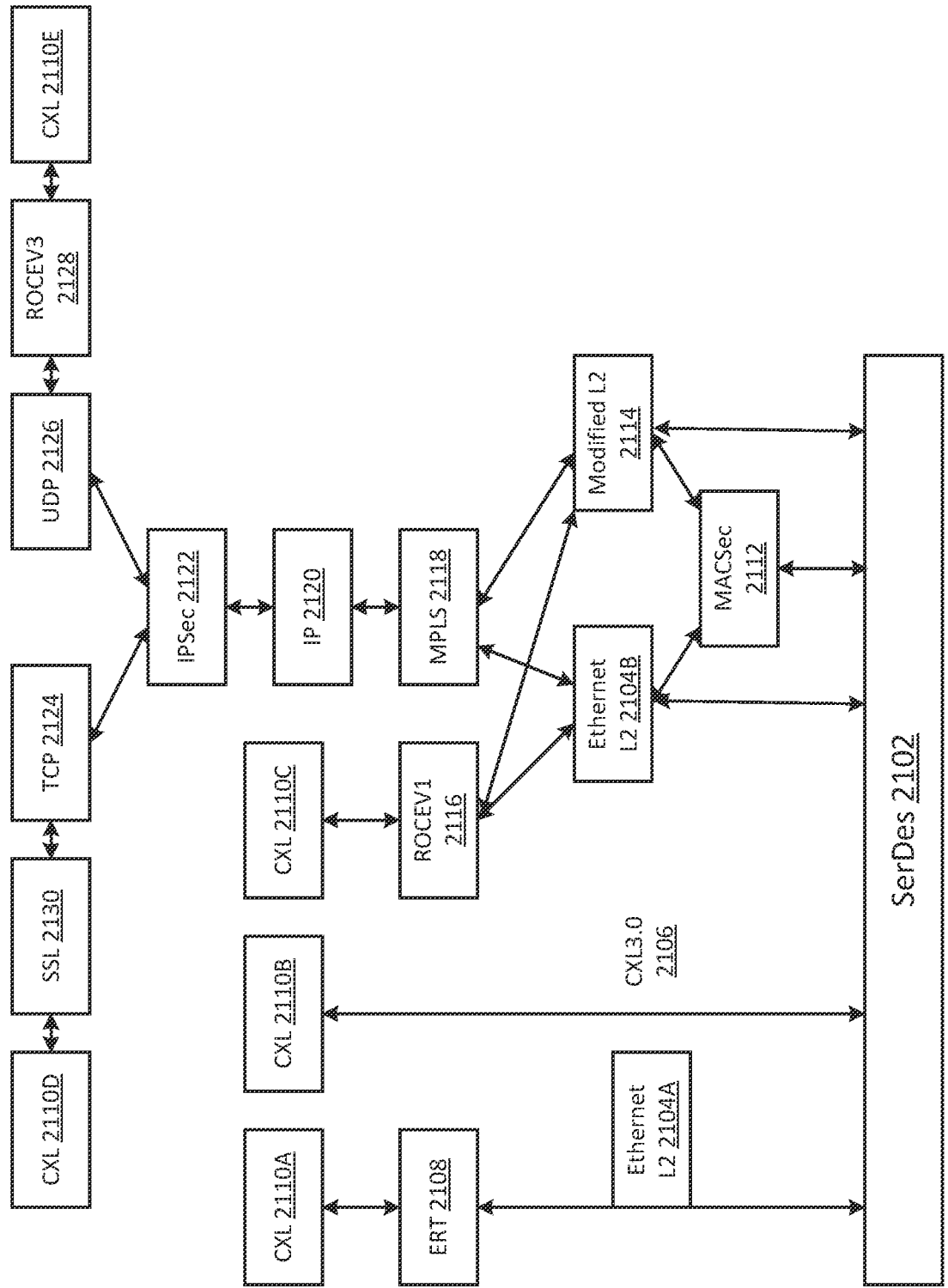
FIG. 21 illustrates a software stack, in accordance with some embodiments.

FIG. 21 illustrates a software stack, in accordance with some embodiments. FIG. 19 illustrates various configurations of software stacks for CXL interfaces to SerDes 2102. Thus, for example, CXL 2110A-E may interface with SerDes 2102 through the techniques described herein. Such interfaces may be via ERT (Elastics.cloud Reliable Transport) 2108, which may be a software transport technique providing for CXL 2110A (which may be CXL 3.0 specification compliant) to couple to an off-site SerDes 2102 via Ethernet Layer 2 (L2 or Data Link Layer) 2104A. Such techniques may be according to the techniques described herein and may allow for off-site utilization of resources for CXL 2110A to interface with SerDes 2102 and the associated resource.

Additionally, FIG. 21 includes CXL 3.0 communications 2106, ROCEV1 (RDMA over Converged Ethernet version 1) 2116, ROCEV3 (RDMA over Converged Ethernet version 3) 2128, Ethernet L2 2104B, Modified L2 2114 (e.g., a modified Data Link Layer that may be utilized not over Ethernet), Media Access Control Security (MACSec) 2112, multi-protocol label switching (MPLS) 2118, Internet Protocol (IP) 2120, IP Security (IPSec) 2122, Transmission Control Protocol (TCP) 2124, Secure Sockets Layer (SSL) 2130, and User Datagram Protocol (UDP) 2126. Modified L2 2114 may include tags in the preamble phase and/or a shorter interframe gap (IFG). CXL 2110A and 2110C-E may be proprietary formats according to CXL and/or IEEE standards. ROCEV3 2128 may include select acknowledgements (SACK).

Variously, CXL 2110 may communicate with SerDes 2102 through various software stacks as described within FIG. 21. Thus, for example, CXL 2110D may communicate over SSL 2130 over TCP 2124 over IPSec 2122 over IP 2120 over MPLS 2118 and over Ethernet L2 2104B or Modified L2 2114. CXL 2110E may communicate over ROCEV3 2128 over UDP 2126 over IPSec 2122 over IP 2120 over MPLS 2118 and over Ethernet L2 2104B or Modified L2 2114. CXL 2110C may communicate over ROCEV1 2116 and over Ethernet L2 2104B or Modified L2 2114. CXL 2110C may communicate over ROCEV1 2116 over Ethernet L2 2104B or Modified L2 2114 and over MACSec 2112. CXL 2110B may be CXL 3.0 specification compliant and may communicate via CXL 3.0 specification with SerDes 2102.

Figure 22A:
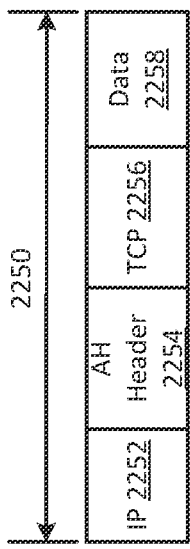
FIGS. 22A and 22B illustrate IP Security headers, in accordance with some embodiments.
Figure 22B:
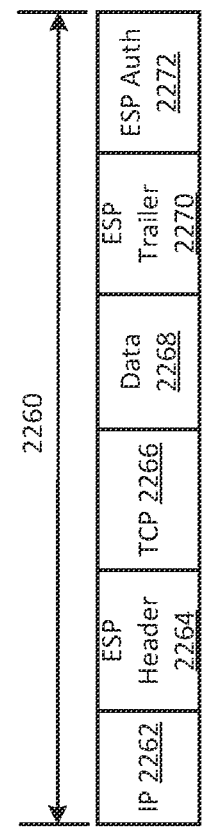

FIGS. 22A and 22B illustrate IP Security headers, in accordance with some embodiments. FIG. 22A may illustrate header 2250 that includes IP 2252, AH (authentication) header 2254, TCP 2256, and data 2258. Header 2250 may be an authentication header. FIG. 22B may illustrate header 2260 that includes IP 2262, encapsulating security payload (ESP) header 2264, TCP 2266, data 2268, ESP trailer 2270, and ESP authentication 2272. Header 2260 may be an ESP header.

- 0: Normal Ethernet Frame
- 1: LL HPC (8 Bytes messages)
- 2: High BW HPC
- 3: Large Payload GPU
- 4: Latency sensitive GPU
- 5: Latency sensitive AI Traffic
- 6: High BW AI traffic
- 7: Video traffic
- 8: CXL2.0 Flit
- 9: CXL 3.0 Flit
- 10-12: CXL.io
- 13-15: CXL.$
- 16-18: CXL.mem
- 19: Latency sensitive AVB (Audio, Video, Broadcast)
- 20: Fabric manager traffic
- 21-255: Reserved Any of the disclosed embodiments may be embodied in various types of hardware, software, firmware, computer readable media, and combinations thereof. For example, some techniques disclosed herein may be implemented, at least in part, by non-transitory computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of non-transitory computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A non-transitory computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various embodiments have been described herein, it should be understood that they have been presented by way of example only, and not limitation. For example, some techniques and mechanisms are described herein in the context of fulfillment. However, the disclosed techniques apply to a wide variety of circumstances. Particular embodiments may be implemented without some or all of the specific details described herein. In other instances, well known process operations have not been described in detail in order not to unnecessarily obscure the techniques disclosed herein. Accordingly, the breadth and scope of the present application should not be limited by any of the embodiments described herein, but should be defined only in accordance with the claims and their equivalents.

The invention claimed is:

1. An integrated circuit device comprising:
a Compute Express Link (CXL) interface connected to a processor, memory, and a plurality of accelerators over CXL, the CXL interface comprising a plurality of virtual input queues (VIQs) and virtual output queues (VOQs);
an Ethernet interface supporting Ethernet traffic through a serializer/deserializer (SERDES);
a CXL controller configured to handle error correction and manage a flow of data between the processor, memory, and a plurality of devices;
a CXL over Ethernet (COE) module connected to the CXL interface, wherein the COE module operates to bridge Ethernet traffic with CXL signals by adding a COE tag to Ethernet frames, wherein in a first mode, the VIQs and VOQs are driven by the CXL controller and in a second mode, the VIQs and VOQs are driven by the COE module.

2. The integrated circuit device of claim 1, wherein the first mode is a CXL mode.

3. The integrated circuit device of claim 1, wherein the second mode is an Ethernet mode.

4. The integrated circuit device of claim 1, wherein the integrated circuit device is a CXL over Ethernet (COE) station operating as a bridge between CXL and Ethernet.

5. The integrated circuit device of claim 1, wherein the integrated circuit device is implemented on a system on a chip (SOC).

6. The integrated circuit device of claim 1, wherein the plurality of accelerators include a plurality of hardware accelerators.

7. The integrated circuit device of claim 1, wherein the integrated circuit device further includes a cache coherent switch on chip.

8. The integrated circuit device of claim 1, wherein the integrated circuit device is communicatively coupled to the plurality of hardware accelerators, wherein the cache coherent switch on chip is configured to provide cache coherency between the plurality of hardware accelerators.

9. The integrated circuit device of claim 1, wherein the Ethernet interface comprises a plurality of scheduler/packers and decoders.

10. The integrated circuit device of claim 1, wherein the COE module is connected to a Media Access Control (MAC) sublayer operable to assign a unique address to each network interface card (NIC) connected to an Ethernet network.

11. The integrated circuit device of claim 1, wherein the CXL controller is connected to a Physical Coding Sublayer (PCS), wherein the PCS is configured to encode and decode data signals for transmission over a physical media.

12. The system of claim 1, wherein the Ethernet interface comprises a plurality of scheduler/packers and decoders.

13. A system comprising:
   memory;
   a processor;
   a Compute Express Link (CXL) interface connected to the processor, memory, and a plurality of accelerators over CXL, the CXL interface comprising a plurality of virtual input queues (VIQs) and virtual output queues (VOQs);
   an Ethernet interface supporting Ethernet traffic through a serializer/deserializer (SERDES);
   a CXL controller configured to handle error correction and manage a flow of data between the processor, memory, and a plurality of devices;
   a CXL over Ethernet (COE) module connected to the CXL interface, wherein the COE module operates to bridge Ethernet traffic with CXL signals by adding a COE tag to Ethernet frames, wherein in a first mode, the VIQs and VOQs are driven by the CXL controller and in a second mode, the VIQs and VOQs are driven by the COE module.

14. The system of claim 13, wherein the first mode is a CXL mode.

15. The system of claim 13, wherein the second mode is an Ethernet mode.

16. The system of claim 13, wherein the system is a CXL over Ethernet (COE) station operating as a bridge between CXL and Ethernet.

17. The system of claim 13, wherein the system is implemented on a system on a chip (SOC).

18. The system of claim 13, wherein the plurality of accelerators include a plurality of hardware accelerators.

19. The system of claim 13, wherein the system further includes a cache coherent switch on chip.

20. The system of claim 13, wherein the system is communicatively coupled to the plurality of hardware accelerators, wherein the cache coherent switch on chip is configured to provide cache coherency between the plurality of hardware accelerators.

* * * * *